United States Patent
Cook et al.

[19]

[11] Patent Number: 5,997,740

[45] Date of Patent: Dec. 7, 1999

[54] LIFTING MECHANISM ASSEMBLY FOR A ROTARY DRIVE ASSEMBLY

[75] Inventors: Robert Cook; John W. Thorum, both of Salt Lake City, Utah; Leonard J. A. Wood, Wyee, Australia

[73] Assignee: Baker Hughes Incorporated, Houston, Tex.

[21] Appl. No.: 08/908,237

[22] Filed: Aug. 7, 1997

Related U.S. Application Data

[63] Continuation-in-part of application No. 08/671,098, Jun. 28, 1996, abandoned, which is a continuation of application No. 08/210,754, Mar. 21, 1994, abandoned, and a continuation-in-part of application No. 08/873,627, Jun. 12, 1997, abandoned, which is a continuation of application No. 08/572,266, Dec. 13, 1995, abandoned.

[30] Foreign Application Priority Data

Mar. 24, 1993 [AU] Australia ................................. PL7949
Dec. 16, 1994 [AU] Australia ................................ 80499/94

[51] Int. Cl.$^6$ .................................................. B01D 21/18
[52] U.S. Cl. ........................ 210/236; 210/528; 210/531; 210/541
[58] Field of Search .................... 210/236, 237, 210/525, 528, 531, 541, 542

[56] References Cited

U.S. PATENT DOCUMENTS

| | | | |
|---|---|---|---|
| 2,051,149 | 8/1936 | Nordell | 210/528 |
| 2,184,020 | 12/1939 | Repasy . | |
| 2,349,772 | 5/1944 | Lister | 210/531 |
| 2,437,761 | 3/1948 | Scott . | |
| 2,557,316 | 6/1951 | Scott . | |
| 2,650,707 | 9/1953 | Scott . | |
| 2,967,433 | 1/1961 | Phillips . | |
| 3,191,775 | 6/1965 | Schepman | 210/528 |
| 3,200,956 | 8/1965 | Raynor et al. | 210/531 |
| 3,390,782 | 7/1968 | Liebowitz | 210/531 |
| 3,465,888 | 9/1969 | Jablon | 210/531 |
| 3,704,789 | 12/1972 | Jablon et al. | 210/531 |
| 3,871,778 | 3/1975 | Schulte et al. . | |
| 3,910,843 | 10/1975 | Grzina et al. | 216/531 |
| 4,118,321 | 10/1978 | Bogen . | |
| 4,367,591 | 1/1983 | Hirabayashi et al. . | |
| 4,424,130 | 1/1984 | King . | |
| 4,462,908 | 7/1984 | Eichler et al. . | |
| 4,515,694 | 5/1985 | Haymore et al. . | |
| 4,624,787 | 11/1986 | Haymore et al. . | |
| 4,676,436 | 6/1987 | Willis . | |
| 4,946,652 | 8/1990 | Dewald et al. . | |
| 5,014,953 | 5/1991 | Warnan et al. . | |
| 5,076,533 | 12/1991 | Schubert . | |
| 5,200,079 | 4/1993 | Schwartz et al. . | |
| 5,224,682 | 7/1993 | Baughman . | |

FOREIGN PATENT DOCUMENTS

| | | |
|---|---|---|
| 212895 | 2/1958 | Australia . |
| 2246612 | 3/1973 | Germany . |

*Primary Examiner*—Christopher Upton
*Attorney, Agent, or Firm*—Trask, Britt & Rossa

[57] ABSTRACT

A lifting mechanism for a sedimentation tank is provided for vertically raising and lowering a rake assembly in such sedimentation tank. The lifting mechanism comprises one or more elongate members pivotally connected to certain structural elements of the assemblage, such as the rotary drive motor, rake assembly, column or bridge. The pivotal connections of the elongate members are positioned about a horizontal axis and are oriented to receive the torque forces imposed on the assemblage as the rake assembly rotates in the tank simultaneously with vertical lifting. The torque forces are translated into the pivotal connections and are able to counteract those forces to facilitate vertically raising and lowering the rake assembly while it is being rotated in the sedimentation tank.

37 Claims, 21 Drawing Sheets

LIFTING MECHANISM ASSEMBLY FOR A ROTARY DRIVE ASSEMBLY

RELATED APPLICATIONS

This application is a continuation-in-part of and claims priority from Ser. No. 08/671,098 filed Jun. 28, 1996, now abandoned, which is a continuation of Ser. No. 08/210,754 filed Mar. 21, 1994, now abandoned, which is based on Australian Application No. PL7949 filed Mar. 24, 1993. This application is also a continuation-in-part of and claims priority from Ser. No. 08/873,627 filed Jun. 12, 1997, now abandoned, which is a continuation of Ser. No. 08/572,266 filed Dec. 13, 1995, now abandoned, which is based on Australian Application No. 80499/94 filed on Dec. 16, 1994.

BACKGROUND

1. Field of the Invention

This invention relates to a lifting and guiding assembly for maintaining a rotary drive assembly, such as is used in mining and/or fluid thickening operations, in a desired orientation while vertically raising or lowering the rake drive assembly. Typically, these are used in liquid/solids sedimentation to raise and lower rotatable rake arms which engage settled solids within a tank and move the solids to a tank bottom outlet.

2. Statement of the Art

Vertical rotary drive shafts are generally fitted with lifting means capable of raising and lowering the drive shaft as required. Normally, the drive shaft is located in slidable engagement with a surrounding sleeve which serves to assist in maintaining the drive shaft in substantially vertical orientation. The sleeve is engaged with a motor so that, in operation, the motor rotates the sleeve. The sleeve and the drive shaft are connected so rotation of the sleeve also rotates the drive shaft. This connection is typically a sliding guide key arrangement by which drive torque is transmitted from the sleeve to the vertical drive shaft.

These types of devices have many uses in the mining industry and are also used in liquid/solids sedimentation assemblies. Thickeners or settling apparatus are used for solid-liquid separation of slimes, slurries and sludges. Such settling apparatus generally includes a relatively large settling tank and rotary rakes supported within the tank. The rotary rakes usually include rake arms positioned near the bottom of the tank and are driven to move settled material to a central outlet or to a tank periphery outlet.

It is well known that the vertical drive shaft connected to the rotary rakes is subjected to very high torques when rotated. The degree of torque experienced by the shaft is dependent upon the resistance to rotation experienced by distant portions of the shaft. This resistance arises primarily as a result of rake arms at the end of the shaft encountering resistance as they are rotated near the bottom of the tank through a liquid or through settled solids.

Additional stresses are placed upon the shaft when horizontal forces are also brought to bear on the shaft; for instance, when the drive shaft is deflected from its vertical position or where, in thickening operations, different densities of the sludge being raked by the rake arms place sideways pressures on the vertical shaft. The shaft also experiences vertical forces resulting from vertical lifting of the rake assembly in the tank (i.e., a dead load force).

These torque, horizontal and vertical forces on the drive shaft increase the friction between the shaft and the surrounding vertical sleeve in conventional systems. The amount of friction is proportional to such forces. When the drive shaft is lifted, the lifting means has to overcome these frictional forces in addition to the dead load force. This places additional strain on the lifting means.

Most thickeners are fitted with a lifting device which is capable of lifting the vertical drive shaft and rake arms above their normal operating position (i.e., with the rake arms positioned near the bottom of the tank) when it is desired to limit the torque applied to such vertical drive shaft and rakes. In this arrangement, the lifting device and the sliding guide key arrangement are adapted so that the drive shaft and rake arms may be lifted while the sleeve is still able to transmit drive torque to the drive shaft. Under high torque and/or high horizontal pressures, the frictional forces between the drive shaft and the sliding guide key arrangement may exceed the weight of the drive shaft and rake arm and require very powerful lifting devices (e.g. hoists, screw jacks or hydraulic cylinders) to lift the drive shaft and rake arm.

One type of thickener assembly is column-mounted. That is, it is generally secured on top of a rigid column. In such a thickener assembly, a rake drive unit is seated on the column, and includes a motor and gear boxes for rotating a cylindrical cage. The cage has one or more vertical legs connected to generally horizontal rake arms. One of the problems with conventional column-mounted thickener assemblies is that large frictional forces are also experienced as a result of the considerable torque forces imposed on the legs and rake arms as the rake arms rotate through the liquid or settled solids in the tank. Accordingly, when using conventional guiding means for maintaining the cage and legs in generally vertical orientation while raising or lowering them, the large frictional forces increase the amount of lifting force needed by the lifting means and a high powered lifting device is required. Another lifting device is disclosed in U.S. Pat. No. 4,624,787 which uses a pulley system to achieve the desired lift. This arrangement is complex and requires constant maintenance of the cable and pulleys.

With the above problems in mind, the present invention is directed towards improved guiding assembly mechanisms which optimally transfer torque forces, as well as horizontal forces and vertical (i.e., dead load) forces, from the rotating rake assembly and provide links which effectively lower the frictional forces encountered in conventional lifting mechanisms while providing simple linkage assemblies which avoid the need for employing heavy fabrication assemblies.

SUMMARY OF THE INVENTION

According to the present invention, there is provided a lifting mechanism assembly for maintaining a rotary drive assembly in a predetermined vertical orientation while raising or lowering the rake drive assembly. The lifting mechanism assembly includes a linkage extending between a stationary support and either a rotary drive mechanism or the rake assembly. The linkage comprises at least one elongate member pivotally mounted at one end thereof to the stationary support to provide pivotal movement about a horizontal axis, and pivotally mounted at its other end to the rotary drive mechanism to provide pivotal movement about a horizontal axis. The linkage is structured to receive and counteract torque created by the rotary drive mechanism in rotating the rake assembly and for enabling vertical movement of the rake assembly, and the rotary drive mechanism in some embodiments, relative to the stationary support. A lifting or actuation mechanism for lifting the rake assembly, and the rotary drive mechanism in some embodiments, is included. The lifting mechanism assembly may also serve as a guiding assembly for guiding the movement of the rake assembly.

According to a first general embodiment of this invention, the guiding assembly comprises at least one pair of vertically spaced, substantially parallel arms rotatably mounted on a support structure (i.e., stationary support) and rotatably connected to the drive assembly (i.e., the rotary drive mechanism). Preferably, the guiding assembly comprises two pairs of vertically spaced, substantially parallel arms, each of said pairs of arms being horizontally spaced from and substantially parallel to the other pair of arms. More preferably, the parallel arms of the guiding assembly are rotatably (i.e., pivotally) mounted on the support structure at one end of each of the arms and the arms are rotatably (i.e., pivotally) connected to the drive assembly at the other end of each of the arms. The arms are of fixed length.

Where the guiding assembly comprises two pairs of vertically spaced, substantially parallel arms as described above, each such pair of arms consists of an upper arm and a lower arm. In order to provide the guiding assembly with greater strength and rigidity, it is preferred that the upper arms of the two pairs of arms are connected by a supporting brace and the lower arms of the two pairs of arms are also connected by a supporting brace.

When the above-mentioned rotary drive assembly is raised or lowered and guided by the above-mentioned guiding assembly, the substantially parallel arms of the guiding assembly will be caused to rotate (i.e., pivot) about the mountings on the support structure. This will cause the drive assembly to undergo some degree of horizontal displacement by virtue of the arcuate motion of distant portions of the substantially parallel arms.

In order to reduce such horizontal displacement of the drive assembly during lifting or lowering of the drive assembly, and according to another embodiment of this invention, there is provided a guiding assembly for maintaining a rotary drive assembly in a predetermined orientation while raising or lowering the drive assembly, said lifting and guiding assembly comprising a first pair of vertically spaced, substantially parallel arms rotatably (i.e., pivotally) mounted on a first support structure, a second pair of vertically spaced, substantially parallel arms rotatably (i.e., pivotally) mounted on a second support structure opposite the first support structure, an upper link arm connecting upper arms of the first and second pairs of arms, said upper link arm being rotatably (i.e., pivotally) connected to said upper arms, and a lower link arm connecting lower arms of the first and second pairs of arms, said lower link arm being rotatably (i.e., pivotally) connected to said lower arms, wherein each link arm is rotatably (i.e., pivotally) connected to the drive assembly at a point intermediate the connections between the link arm and the respective arms to which it is connected.

In this other embodiment of the invention, it is further preferred that the guiding assembly also comprises a third pair of vertically spaced, substantially parallel arms rotatably (i.e., pivotally) mounted on the first support structure and being horizontally spaced from and substantially parallel to the first pair of arms, a fourth pair of vertically spaced, substantially parallel arms rotatably (i.e., pivotally) mounted on the second support structure and being horizontally spaced from and substantially parallel to the second pair of arms, an upper link arm connecting upper arms of the third and fourth pairs of arms, said upper link arm being rotatably (i.e., pivotally) connected to said upper arms, and a lower link arm connecting lower arms of the third and fourth pairs of arms, said lower link arm being rotatably (i.e., pivotally) connected to said lower arms, wherein each link arm is rotatably (i.e., pivotally) connected to the drive assembly at a point intermediate the connections between the link arm and the respective arms to which it is connected. The two ends of the above-mentioned link arms are preferably rotatably connected to ends of the respective parallel arms.

In this embodiment of the invention, when the drive assembly is lifted or lowered, the substantially parallel arms pivotally rotate about their mountings about a horizontal axis on the relevant support structures. This causes each link arm, positioned between the two upper arms and the two lower arms, respectively, to rise or fall and to rotate relative to the arms to which it is connected. As each link arm rises or falls, the position of the pivotally rotatable connection with the drive assembly moves in a substantially vertical direction only and will not, to any significant extent, be displaced horizontally.

It is preferred that the upper arms of the first and third pairs of arms are connected by a supporting brace. Similarly, it is desirable that the second and fourth pairs of arms are also connected by a supporting brace. This obviously provides the guiding assembly with greater strength and rigidity.

According to yet another embodiment of this first general embodiment of the invention, there is provided a lifting mechanism assembly comprising a rotary drive assembly having a rotary drive unit in operational engagement with a drive shaft, a lifting mechanism adapted to raise and lower the rotary drive assembly, and a guiding assembly as previously described. The rotary drive assembly may further comprise a support frame to which the rotary drive unit is fastened. Preferably the support frame will have a substantially L-shaped cross section, in which case the drive unit is fastened to a substantially horizontal section of the frame. In this case, part of the drive unit may extend through a hole or cavity in the support frame in order to engage an upper end of the drive shaft. The pivotally rotatable connections between the drive assembly and the substantially parallel arms of the guiding assembly may, preferably, be located on a substantially vertical section of the support frame. The rotary drive unit may comprise a drive motor and a gear arrangement to enable the drive shaft to be rotated over a wide range of speeds.

The lifting or actuation mechanism of the assembly may be any suitable lifting device such as a hydraulic cylinder. By way of example, the lifting or actuation mechanism may comprise a nut adjacent the support frame and a nut housing for inhibiting removal of the nut from the support frame, and a substantially vertical screw mounted on a base structure adapted to be received by and cooperate with the nut. Rotation of the nut relative to the screw causes the support frame to move vertically with the nut. The vertical screw may extend through a hole in the support frame adjacent to which is located the nut and nut housing. The nut may be rotated by a cooperating threaded worm shaft. In this case, the nut has external teeth adapted to engage and cooperate with the thread of the worm shaft. The assembly of this alternative embodiment has particular application in drilling operations, fluid, or slurry mixing operations or fluid-thickening operations.

According to another embodiment of this first general embodiment of the invention, there is provided a lifting mechanism assembly comprising a rotary drive assembly having a rotary drive unit in operational engagement with a drive cage, a lifting or actuation mechanism adapted to raise and lower the rotary drive assembly and a guiding assembly (i.e., linkage) as previously described. The support structure (i.e., stationary support), to which one end of the substantially parallel arms of the guiding assembly are rotatably (i.e., pivotally) mounted, comprises a central column. The pivotally rotatable mounting is located adjacent the top of the central column and the drive cage is adapted to rotate about a longitudinal axis of the central column.

The rotary drive assembly of this embodiment of the invention preferably comprises a support frame to which the rotary drive unit is fastened. The support frame preferably has a substantially L-shaped cross section, the drive unit being fastened to a substantially horizontal section of the frame. The pivotally rotatable connections between the drive assembly and the substantially parallel arms of the guiding assembly are preferably located on a substantially vertical section of the support frame.

In this embodiment, the lifting or actuation mechanism may preferably comprise a nut adjacent the support frame and a nut housing for inhibiting removal of the nut from the support frame and a substantially vertical screw, mounted on the central column, adapted to be received by and to cooperate with the nut whereby rotation of the nut relative to the screw causes the support frame to move vertically with the nut. In all other respects, the lifting means may operate as described above in relation to the other previously described embodiments.

The drive cage preferably comprises one or more elongated vertical legs. Although the number of such legs may vary according to the desired application, four such legs have been found to be a particularly suitable number. A rake arm may be attached to each of the vertical legs, the rake arm extending transverse to the direction of the legs in order to facilitate mixing or thickening of the liquid or slurry. The drive unit of the rotary drive assembly preferably comprises a main gear box and a pinion gear box. The main gear box preferably has an outer rotating section which is attached to an inner stationary section of the main gear box by means of a bearing assembly. Under the action of the pinion gear box, the outer rotating section of the main gear box is caused to rotate, thereby rotating the drive cage. By virtue of the simultaneous action of the pinion gear box and the lifting mechanism, the drive cage can be rotated and vertically lifted at the same time. The assembly of this embodiment has particular application in fluid, or slurry mixing operations or fluid thickening operations.

In a second general embodiment of the invention, the lifting and guiding mechanism assembly includes an inner body and an outer body which is located about at least a portion of the inner body and is in substantially co-axial alignment with the inner body. The outer body is movable relative to the inner body in an axial (i.e., vertical) direction. The linkage mechanism of the embodiment includes a first set of at least three link arms which extends between the inner body and the outer body, the link arms being adapted to maintain the inner body and the outer body in substantially co-axial alignment during relative movement of the bodies. The link arms are of fixed length.

The link arms are rotatably (i.e., pivotally) connected to the inner body and to the outer body. Each link arm extends in a non-radial direction relative to the axis between the inner and outer bodies. It is further preferred that, where the first set of link arms comprises three link arms, the link arms are radially separated from an adjacent arm by 120°. The respective connections between the link arms and the inner and outer bodies need to be positioned accordingly.

In use, when the inner and outer bodies move relative to one another, causing the link arms to rotate, the rotation of the link arms causes the inner body and the outer body to rotate or twist very slightly relative to each other. This places a slight lateral force on the link arms. To allow for this slight lateral force, the link arms are preferably connected to the inner and outer bodies by suitable connection mechanisms, such as ball joints, which allow for some lateral movement in the link arms. For additional stability, it may be preferred that the lifting and guiding mechanism assembly include a second set of at least three link arms axially (i.e., vertically) displaced from the first set of link arms. Preferably, the link arms of the second set of link arms are substantially parallel with the link arms of the first set of link arms.

In a first aspect of the second general embodiment of the invention, the outer body is a stationary support by virtue of its fixture to a support structure, such as a bridge. The inner body is rotationally movable in an axial direction within the outer body and is connected to the rotary drive assembly. The inner body may be of substantially hollow cylindrical construction and may have a support plate onto which the rotary drive assembly may be secured and through which a drive shaft may extend. In this aspect, the guiding assembly may further include a lifting or actuation mechanism such as one or more hydraulic cylinders, located between a base section of the inner body and a portion of the outer body.

In an alternative aspect of this invention, the outer body may be fixed to a stationary support, such as the floor of a tank, and the inner body is movable in an axial direction within the outer body. The rake drive motor, or the rake drive gear box, of the rotary drive assembly is connected to the inner body. In this aspect of the invention, the rotary drive assembly may include a drive cage located about the outer body (i.e., stationary support). The cage may be connected to the rake drive motor or the rake drive gear box by suitable connecting means, such as connecting trusses. In this aspect of the invention, a support surface, such as a horizontal plate, may be located within the outer body, beneath the inner body. The guiding assembly may include lifting means, such as one or more hydraulic cylinders located between the support surface and the inner body.

In a further alternative aspect of the second general embodiment of the invention, the inner body may be fixed (i.e., as a stationary support) and the outer body may be movable in an axial direction. In this case, the rotary drive assembly may be connected to the outer body. The inner body may be a cylindrical column and the outer body may include a hollow cage to which is secured the rotary drive assembly. In this case, the rotary drive assembly may include a drive cage about the hollow cage. The guiding assembly may include a lifting mechanism, such as one or more hydraulic cylinders, located between an upper section of the inner body and a portion of the outer body.

The drive cage discussed above may preferably include one or more elongated vertical legs (e.g., four legs) and a rake arm may be attached to each of the vertical legs, the rake arms extending transverse to the direction of the legs in order to facilitate mixing or thickening of a liquid or slurry.

The rotary drive unit may include a drive motor and a gear arrangement to enable the drive shaft or the drive cage to be rotated over a wide range of speeds. Where the rotary drive assembly includes a drive cage, the drive unit will preferably include a main gear box and a pinion gear box. The main gear box preferably has an outer rotating section which is attached to an inner stationary section of the main gear box by means of a bearing assembly. Under the action of the pinion gear box, the outer rotating section of the main gear box is caused to rotate, thereby rotating the drive cage. By virtue of the simultaneous action of the pinion gear box and the lifting means, the drive cage can be rotated and lifted at the same time.

In a third general embodiment of the present invention, the lifting mechanism assembly comprises at least one linkage assembly pivotally connected at one end to a stationary support and at the other end to either the rotary drive assembly or the rake assembly of the sedimentation tank. The pivotal connections are oriented to provide pivoting rotation about a horizontal axis and the linkages are oriented parallel to the torque forces imposed on the rotary drive assembly so that the torque load is transmitted to the linkage assembly and pivotal connections. A rake assembly is provided to move solids or sludge forming at the bottom of the tank to an underflow outlet of the tank. The rake assembly generally comprises one or more rake arms positioned near the bottom of the tanks, and downwardly extending support arms which connect the rake arms to a rotary drive assembly. Alternatively, the rotary drive assembly comprises a drive motor having a drive shaft connected to a portion of the rake assembly to impart rotation to the rake assembly and thereby cause the rake arms, which are connected to the drive shaft, to sweep out a path along the bottom of the tank.

The lifting mechanism assembly of the present invention includes a linkage extending between a stationary support and the rotary drive mechanism or the rake assembly. In one embodiment, the linkage may extend between a bridge (the stationary support) spanning the diameter of the tank and the rotary drive assembly to which is connected a rotating rake assembly. In another embodiment, the linkage may extend between a column or pier positioned in the center of the tank (the stationary support) and the rotary drive assembly to which is connected the rake assembly. In these two embodiments, the linkage is interconnected to a stationary support and the drive housing which does not rotate, but which houses an output gear which rotates relative to the drive housing by means of a bearing. The rake assembly is connected to the output gear which imparts rotation thereto.

In yet another embodiment, the linkage may extend between the rotating rake assembly and the rotary drive assembly which is carried on a bridge positioned across the tank or on a central column or pier (the stationary support). In this embodiment, the linkage rotates with the rotary drive mechanism and the rake assembly. The linkage translates rotational movement from the rotary drive assembly (i.e., the output gear) to the rake assembly. The elongate member may preferably be of fixed length.

The linkage generally comprises at least one elongate member pivotally mounted to the stationary support and to the rotary drive assembly or the rake assembly. The elongate member may preferably be of fixed length. The elongate member may further comprise a first elongate member pivotally mounted to the stationary support to provide rotation about a horizontal axis and a second elongate member pivotally mounted to the rotary drive mechanism (or rake assembly), the pivotal mounting of each elongate member being about a substantially horizontal axis and being oriented parallel to the torque force imposed on the lifting mechanism assembly during lifting of the rake assembly. The first elongate member and second elongate member are, in turn, connected together by a pivotal connection which is oriented about a substantially horizontal axis and parallel to the torque force. Thus, the torque imposed on the lifting mechanism assembly is transmitted into the pivotal connections of the linkage and the linkage counteracts such forces to facilitate lifting the rake assembly. The linkage of this third general embodiment also acts to transfer horizontal or side forces imposed on the rake assembly, as well as vertical (i.e., dead load) forces imposed when the rake assembly is raised.

The linkage may comprise one pair of elongate members pivotally joined together, or a plurality of pairs of elongate members similarly interconnected between a stationary portion and the rotary drive assembly or rake assembly. In one exemplar embodiment, the elongate members may comprise an upper substantially planar plate and a lower substantially planar plate which is pivotally linked to the upper plate. In operation, the torque forces are transmitted from the upper plate to the lower plate, or vice versa, through the pivotal connections. The plates may preferably be made of metal and structured to withstand the torque forces imposed in the system while providing vertical movement of the rake assembly, such as the drive shaft or the drive cage. Further, the upper plate may be secured to a substantially horizontal support surface, which is associated with a stationary support or the rotary drive mechanism. Likewise, the lower plate may preferably be pivotally connected to a substantially horizontal support surface which is parallel to the upper horizontal surface. A vertical guide member may be included in the lifting mechanism assembly to maintain the horizontal support surface in parallel alignment and to help guide the rake assembly in vertical movement.

The lifting mechanism assembly also includes an actuation or lifting mechanism which generally extends between the stationary support and the rotary drive mechanism or rake assembly to provide an increase or decrease of the vertical distance therebetween, and thereby effect a vertical movement in the rake assembly. Alternatively, in some embodiments, the actuation mechanism may be connected to another stationary support, such as a bridge, and connected to, for example, the rotary drive assembly to vertically raise and lower the drive assembly along with the rake assembly. The actuation mechanism may be any suitable structure, such as a mechanical or hydraulic lift apparatus.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENTS

Figure 1:
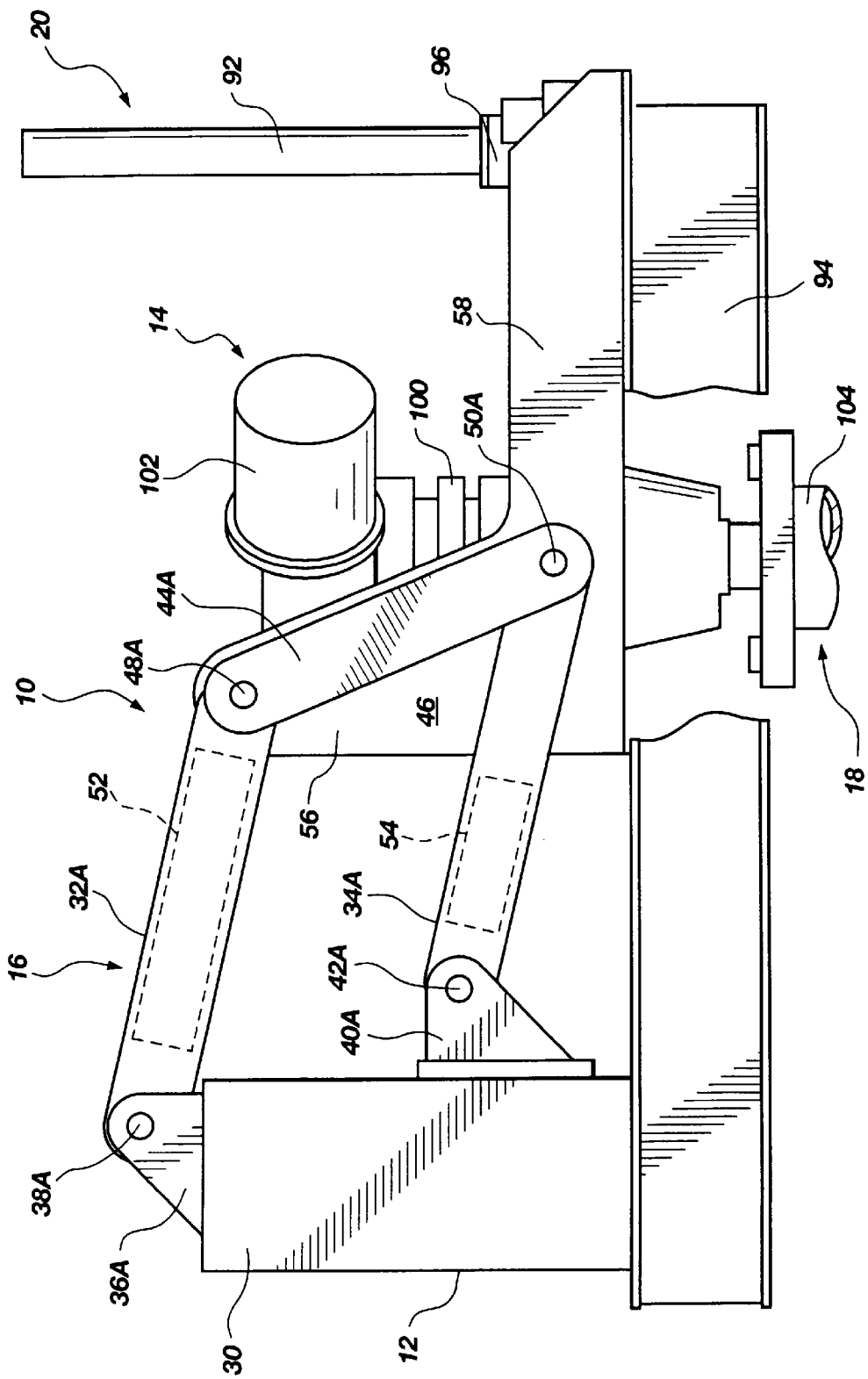
FIG. 1 is a side view of a guiding assembly according to a first aspect of the first embodiment of the invention.

The lifting mechanism assembly 10 of the present invention, comprising a stationary support 12, a rotary drive mechanism 14, a linkage mechanism 16, a rake assembly 18 and a lifting or actuation mechanism 20 is shown in FIGS. 1–24, which cover three different general embodiments for carrying out the invention. Although not illustrated in every figure, the lifting mechanism assembly 10 is associated with a tank 22 having a vertical center line 24. The three general embodiments are discussed separately hereinafter with like elements between the three general embodiments being designated by like reference numerals.

The First General Embodiment of the Invention

Figure 2:
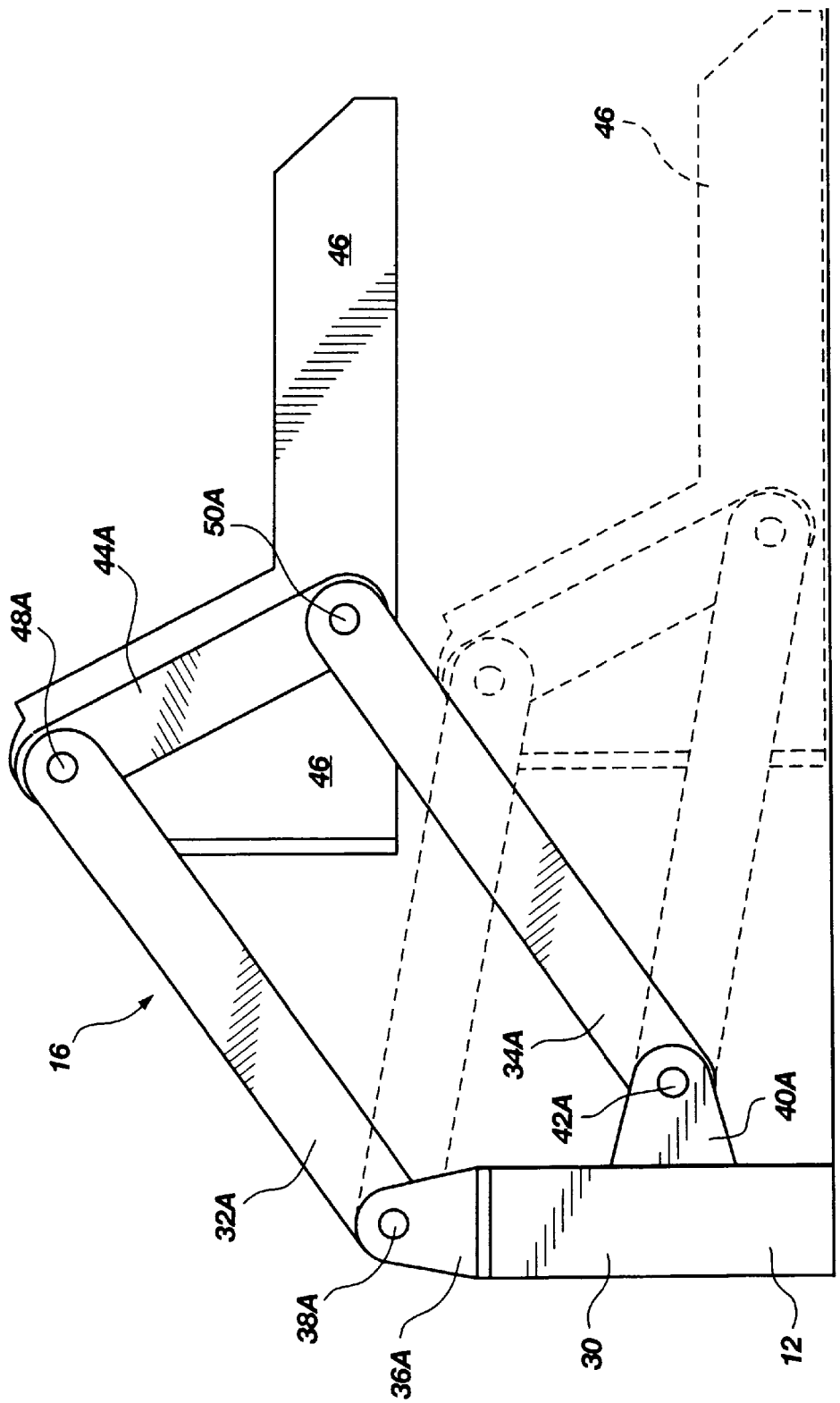
FIG. 2 is a partial side view of the assembly of FIG. 1, illustrating a raised and a lowered orientation of the assembly.
Figure 3:
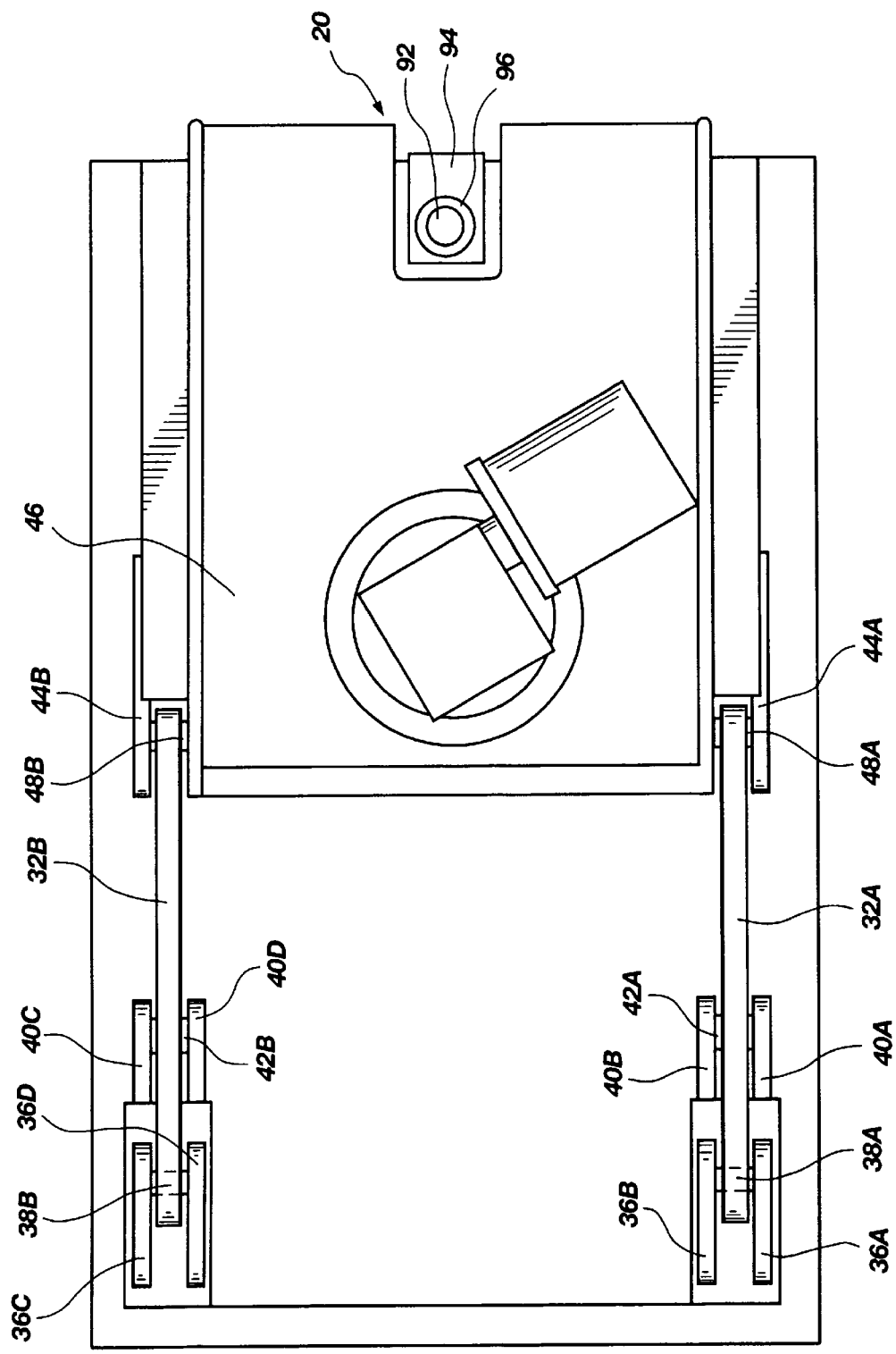
FIG. 3 is a plan view of the assembly of FIG. 1.

As illustrated in FIGS. 1, 2 and 3, a lifting and guiding mechanism assembly 10 is attached to a rigid frame 30 which serves as a stationary support 12. The lifting and guiding mechanism assembly 10 comprises an upper pair of arms 32A, 32B (only one of the pair is shown in FIGS. 1 and 2) and a lower pair of arms 34A, 34B (only one arm is shown in FIGS. 1 and 2). The upper pair of arms 32A, 32B is generally parallel to the lower pair of arms 34A, 34B.

As more clearly shown in FIG. 3, one end of each of the upper pair of arms 32A, 32B is located between and attached to a pair of lugs 36A, 36B and 36C, 36D on the frame 30, by means of connecting pins 38A, 38B, respectively. Each of the lower pair of arms 34A, 34B is attached to a pair of lugs 40A, 40B and 40C, 40D on the frame 30, by means of lower connecting pins 42A, 42B, respectively. Each of the pairs of arms 32A, 32B and 34A, 34B, is free to pivotally rotate about the respective connecting pins 38A, 38B and 42A, 42B which are oriented to provide movement about a horizontal axis.

The distant ends of each of the arms 32A, 32B, 34A, 34B are rotatably connected to connecting arms 44A, 44B, which are affixed to a movable frame 46. One of the upper pair of arms 32A is connected to an upper portion of connecting arm 44A by pin 48A and the other arm 32B of the pair is connected to an upper portion of connecting arm 44B by pin 48B. One of the lower pair of arms 34A is connected to a lower portion of connecting arm 44A by pin 50A and the other arm 34B of the pair of arms is connected to a lower portion of connecting arm 44B by pin 50B. The pins 48A, 48B and 50A, 50B are oriented to provide pivoting movement about a horizontal axis.

Arms 32A and 32B are connected by a supporting brace 52 (the end of which is shown in phantom) which ensures that arms 32A and 32B remain in parallel alignment and that the axis of rotation of pins 48A, 48B is always parallel with the axis of rotation of pins 38A, 38B. Similarly, a supporting brace 54 (the end of which is shown in phantom) also connects arms 34A and 34B together. The movable frame 46, which is affixed to the connecting arms 44A, 44B, has a generally L-shaped vertical cross section, comprising an upright section 56 and a horizontal section 58 (FIG. 1). The connecting arms 32A, 34A are attached to the upright section 56. The horizontal section 58 of the movable frame 46 has a distant end which is adapted to engage a lifting mechanism 20.

Figure 4:
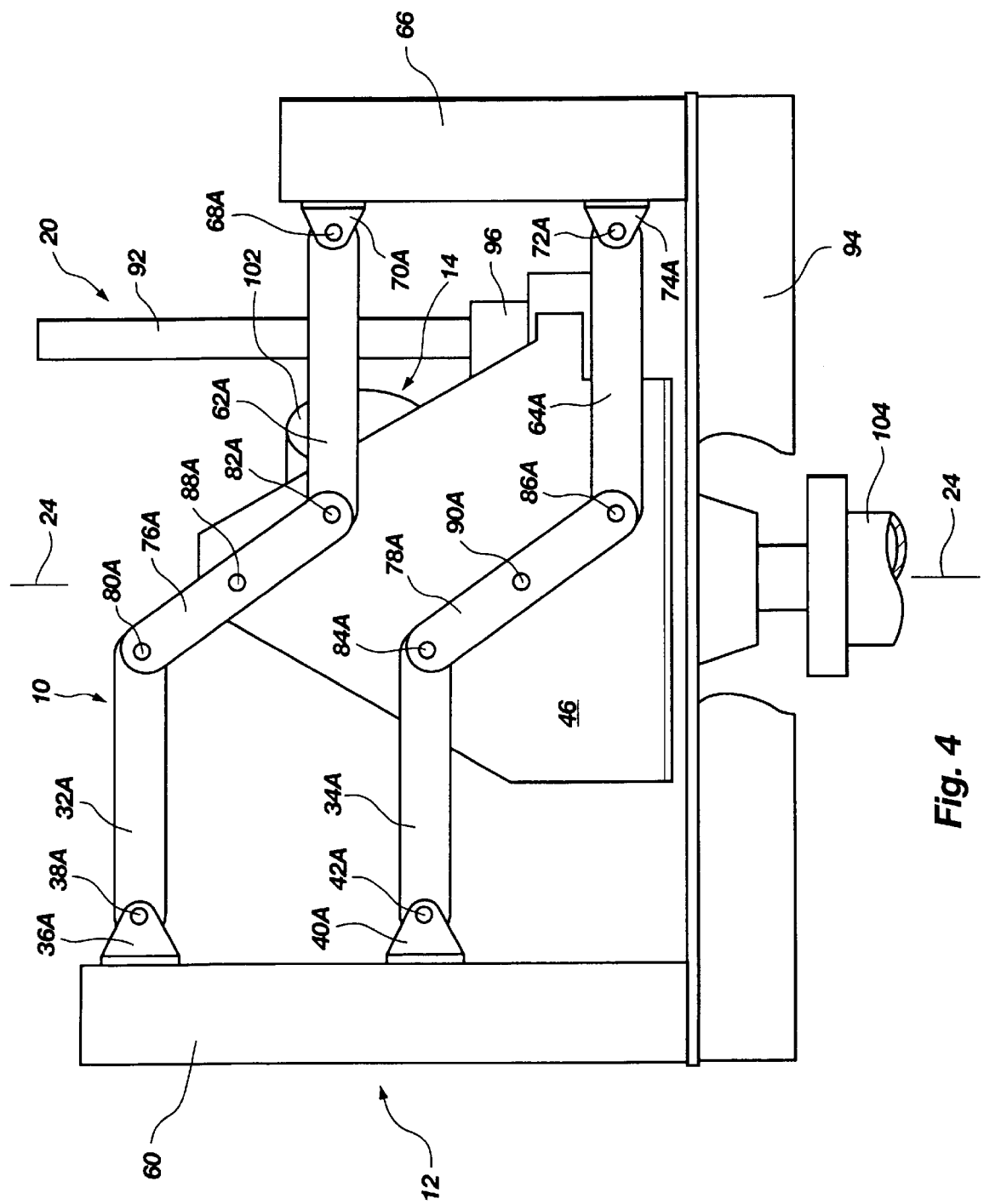
FIG. 4 is a side view of a guiding assembly according to a second aspect of the first general embodiment of the invention.

Another arrangement according to the invention is shown in FIG. 4 where the lifting and guiding mechanism assembly 10 comprises a first pair of vertically spaced, substantially parallel arms 32A and 34A. Each of arms 32A and 34A is rotatably mounted on a first vertical support column 60 (i.e. stationary support 12) by pins 38A and 42A, respectively. Pin 38A is supported by and extends between lugs 36A and 36B (lug 36B is not shown). Pin 42A is supported by and extends between lugs 40A and 40B (lug 40B is not shown). A second pair of vertically spaced, substantially parallel arms 62A, 64A is rotatably mounted on a second vertical support column 66 by pins 68A and 72A, respectively. Upper pin 68A is supported by and extends between lugs 70A and 70B (lug 70B is not shown). Lower pin 72A is supported by and extends between lugs 74A and 74B (lug 74B is not shown). An upper link arm 76A connects upper arms 32A and 62A of the first and second pairs of arms. A lower link arm 78A connects lower arms 34A and 64A of the first and second pairs of arms.

Link arm 76A is rotatably connected to arm 32A by means of a pin 80A, which is horizontally oriented, and to arm 62A by means of a pin 82A, which is oriented horizontally. Link arm 78A is rotatably connected to arm 34A by a pin 84A which is oriented horizontally and to arm 64A by means of a pin 86A which is oriented horizontally. It is understood that for every element described thus far by the designation "A", there is a second like element designated "B" which cannot be seen in the particular side view of FIG. 4. Similar to the embodiment of FIG. 1, the embodiment shown in FIG. 4 also incorporates supporting braces (not shown) connecting arms 62A, 62B and 64A, 64B together, respectively.

At a point approximately midway along link arm 76A is a pin 88A by which the movable frame 46 is rotatably connected to link arm 76A. Similarly, approximately midway along link arm 78A is a pin 90A by which the movable frame 46 is rotatably connected to link arm 78A. In the embodiment shown in FIG. 4, as the movable frame 46 is raised or lowered by virtue of the operation of the lifting mechanism 20, the relevant arms pivotally rotate about horizontal axes in relation to one another and in relation to the vertical supports 60 and 66. During such motion, pins 88A and 90A remain in substantially the same vertical line, corresponding to the vertical center line 24 of the tank, thereby causing the movable frame 46 to move along this vertical line. The lifting mechanism 20 may be, as shown in FIGS. 1–3, a screw jack comprising a vertical screw shaft 92 attached to a base support 94. A rotatable nut 96 is connected to the movable frame 46 and is engaged about the vertical screw shaft 92.

Nut 96 may be rotated by any suitable means. For example, a substantially horizontal worm screw may be used as one non-limiting example. In such a case, the nut 96 will include protruding teeth on its external surface. Those teeth engage the thread of the worm screw (not shown) in such a way that as the worm screw rotates, the nut 96 is also rotated. The worm screw would typically be driven by an electric motor. The rotation imparted to the nut 96 causes the nut 96 to move along the vertical screw to raise or lower the movable frame 46.

Mounted upon the horizontal section of movable frame 46 is a rotary drive mechanism 14 including a rake drive motor 100 (partially shown in FIG. 1) attached to a rake drive gear box 102 (also partially shown in FIG. 1). Extending vertically down from and in operational engagement with the motor 100 is a rake drive shaft 104 which is driven by the motor 100. Rake arms (not shown) are attached to the distant end of the drive shaft 104. As the drive shaft 104 rotates, the rake arms also rotate. By means of the lifting mechanism 20, the movable frame 46 may be raised or lowered, thereby raising or lowering the motor 100, the gear box 102, and the drive shaft 104.

As will be appreciated, in the embodiment of the invention shown in FIGS. 1–3, the pairs of arms 32A, 32B and 34A, 34B guide the drive shaft 104 in a substantially vertical direction while keeping the drive shaft 104 in substantially vertical orientation as the drive shaft 104 is raised or lowered. There is some degree of horizontal displacement of the drive shaft 104, by virtue of the arcuate movement of the movable frame 46 as it rotates about pins 38A, 38B and 42A, 42B, which does place some strain on the drive shaft 104. Although this is generally not sufficient to have any real adverse effect upon the operation of either the lifting mechanism 20 or the operation of the rake arms, this strain is largely avoided in the assembly shown in FIG. 1. In the embodiment of the invention shown in FIG. 4, the rotary drive mechanism 14, including the drive shaft 104, moves in an almost perfectly vertical orientation, with minimal horizontal, or arcuate, motion. This reduction in horizontal movement of the rotary drive mechanism 14 reduces the lateral, or side, forces placed upon the vertical drive shaft 104, thereby reducing frictional forces applied to the lifting and guiding mechanism assembly 10.

Figure 5:
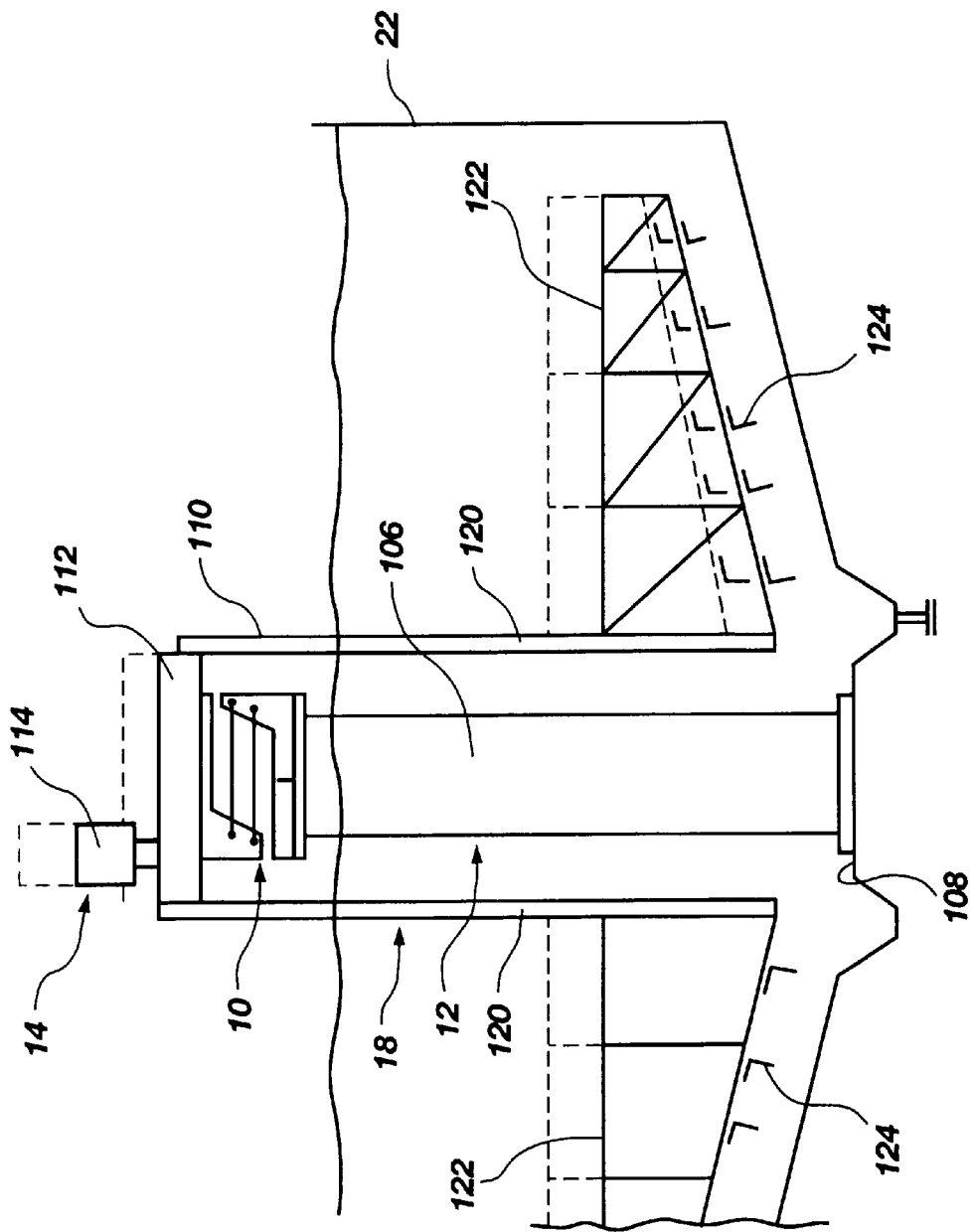
FIG. 5 is a partial cross section view of a separation tank with a guiding assembly according to a further aspect of the first embodiment of this invention located between a central column and a rotary drive assembly.
Figure 6:
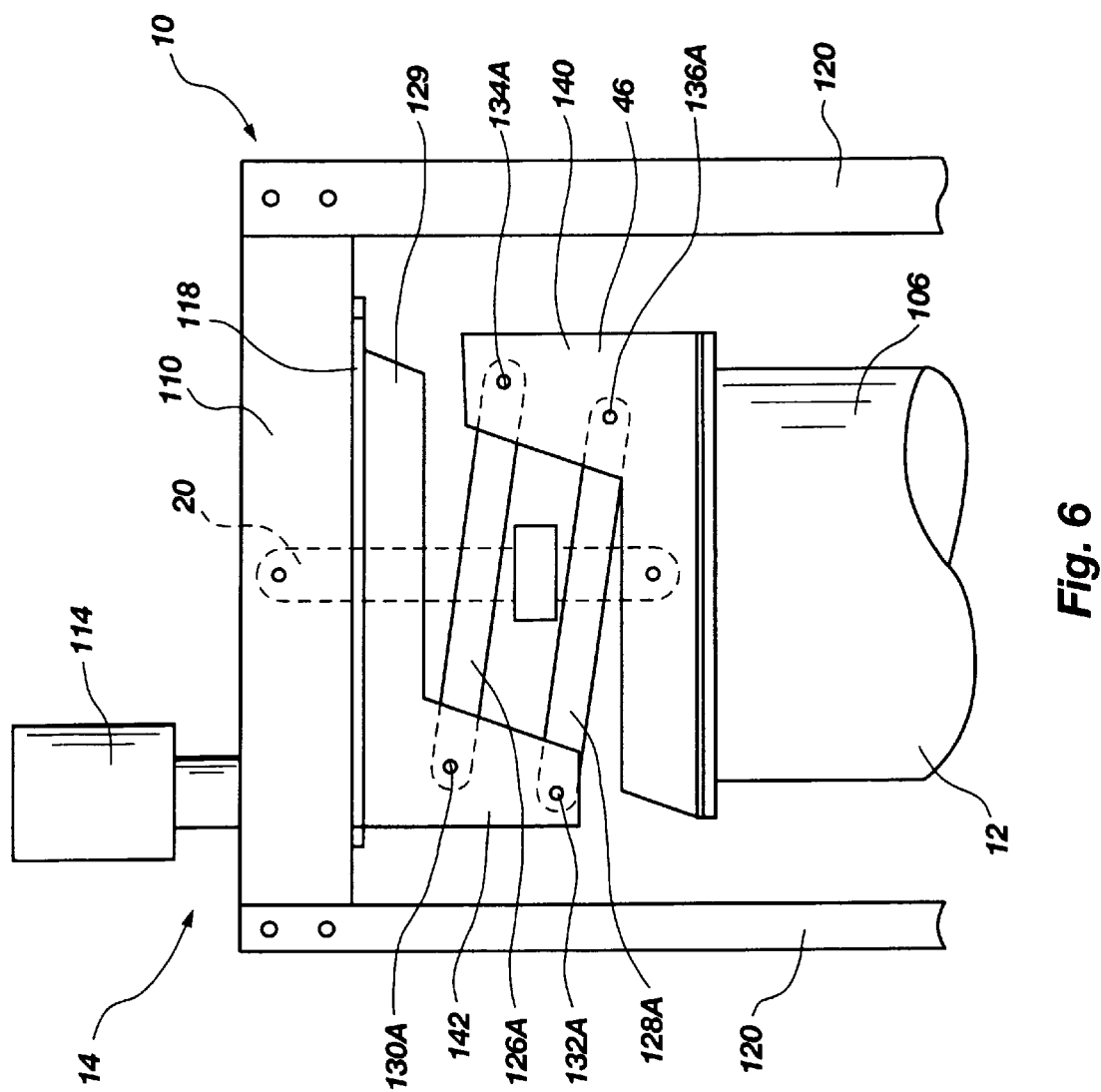
FIG. 6 is an enlarged partial side view of the guide assembly of FIG.5.
Figure 7:
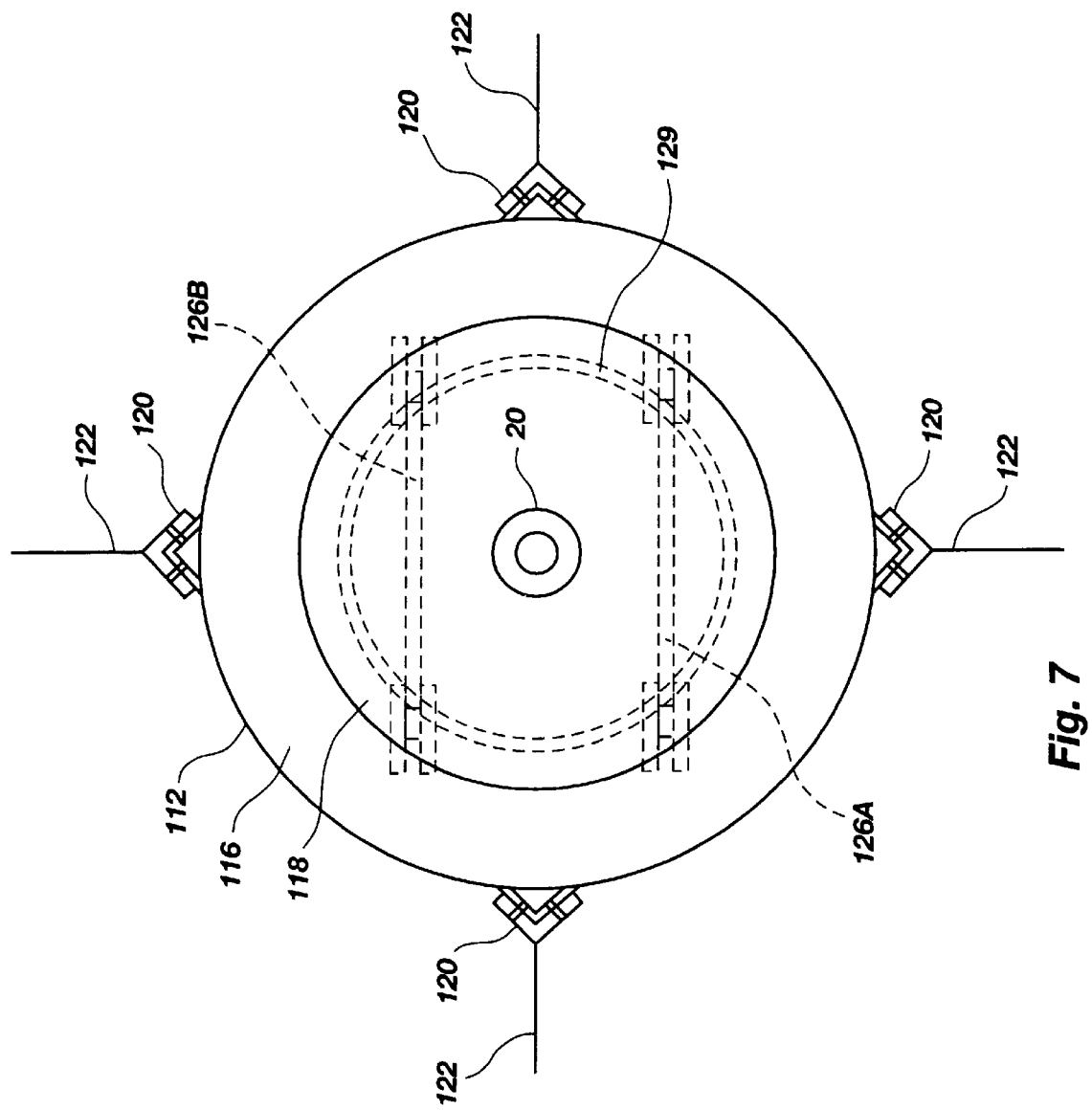
FIG. 7 is a partial plan view of the guide assembly of FIG. 6.

The lifting and guiding mechanism assembly 10 shown in FIGS. 5, 6 and 7 is mounted upon a rigid central column 106 which is affixed to the floor 108 of a settling tank 22. The rotary drive mechanism 14 is in operational engagement with a drive cage 110. The rotary drive mechanism 14 comprises a main gear box 112 and a pinion gear box 114. As shown in FIG. 7, a peripheral section 116 of the main gear box 112 rotates about a stationary inner section 118 of the main gear box 112 by means of a bearing assembly (not shown). The outer rotating peripheral section 116 is rotated by means of the operation of the pinion gear box 114 (not shown in FIG. 7).

Attached to the outer rotating peripheral section 116 of the main gear box 112 is the drive cage 110 having vertical legs 120 extending from the peripheral section 116 of the main gear box 112. Attached to a lower section of each leg 120 is a rake arm 122 extending substantially transverse the direction of the leg 120. As shown in FIG. 5, the rake arm 122 has rake blades 124 extending downwardly therefrom.

As more particularly shown in FIG. 6, the column-mounted lifting and guiding mechanism assembly 10 has a pair of vertically spaced, parallel arms 126A and 128A. One end of each arm 126A and 128A is rotatably connected to a lower L-shaped frame 46. The other end of each arm 126A and 128A is rotatably connected to an upper, movable L-shaped frame 129. The rotatable connections are effected by means of horizontally oriented pins 130A, 132A, 134A and 136A. Extending between the substantially vertical portions 140, 142 of the L-shaped frames 46 and 129, respectively, are the vertically spaced, substantially parallel arms 126A and 128A. Preferably, there are two further such vertically spaced arms which are substantially parallel to and horizontally spaced from the vertically spaced arms 126A and 128A and which are also attached to the opposing frames 46 and 129, but are not viewable from the side view shown. The lifting mechanism 20 is mounted on the central column 106. An upper portion of the lifting mechanism 20 is connected to the main gear box 112.

As the lifting mechanism 20 raises and lowers the main gear box 112 above the central column 106, the vertical legs 120 and the rake arms 122 are raised accordingly. The lifting guiding and mechanism assembly 10 helps to reduce some of the frictional forces which would otherwise need to be overcome by the lifting mechanism 20 by virtue of horizontal forces imparted to the drive cage 110 and by the rotation of the rake arms 122.

The lifting and guiding mechanism assembly 10 of this invention enables a rotating drive shaft or a rotating drive cage to be raised out of or lowered into a fluid separation tank relatively easily, owing to the lower frictional forces within the guiding means. Accordingly, less force is required to raise or lower the drive shaft or drive cage. This results in lower power requirements and enables relatively cheap lifting mechanisms to be employed.

The Second General Embodiment of the Invention

Figure 8:
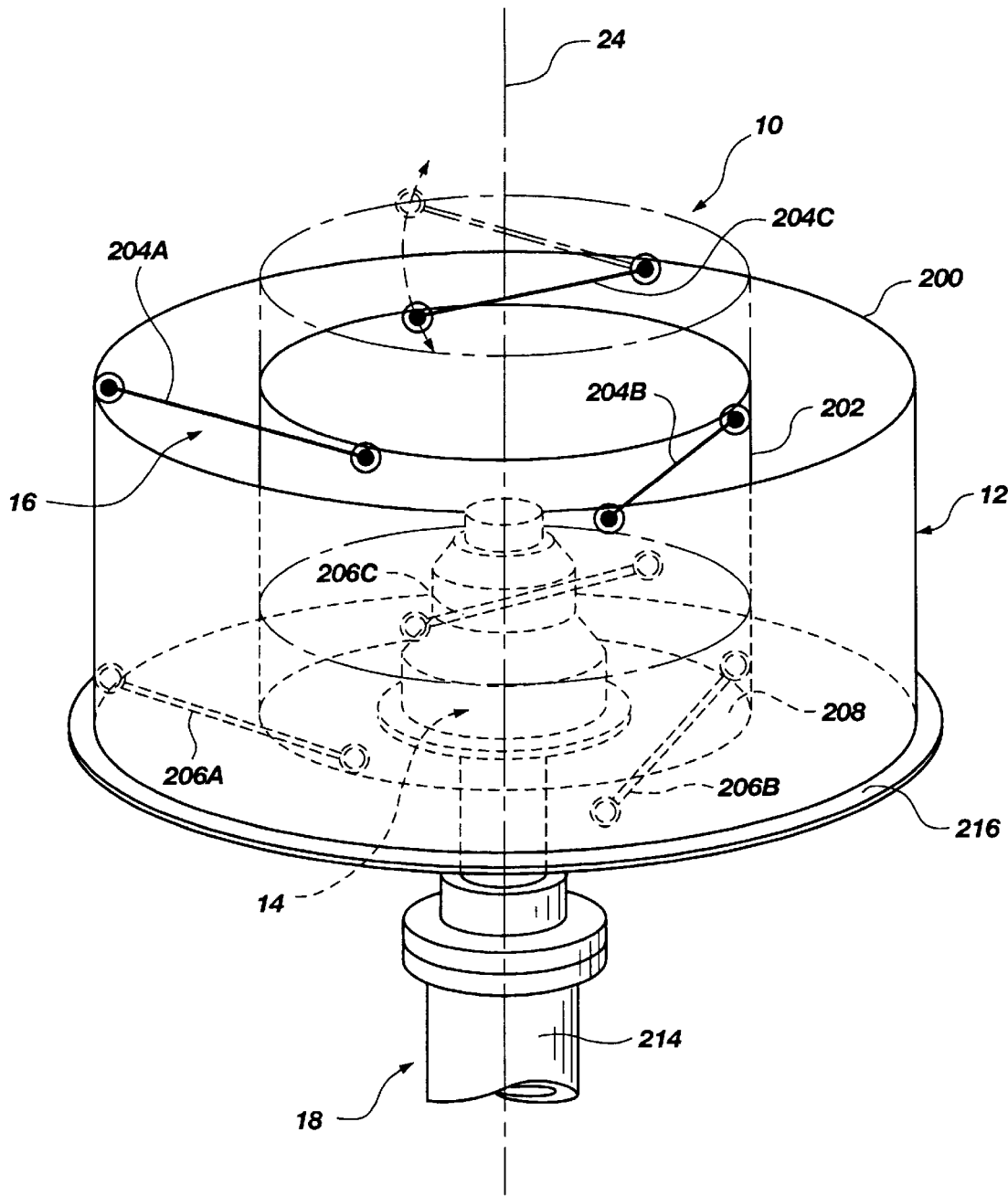
FIG. 8 is a perspective view of a representational illustration of a first aspect of the second general embodiment of the invention showing an inner body which is stationary and an outer body which is connected to the rotary drive assembly.
Figure 9:
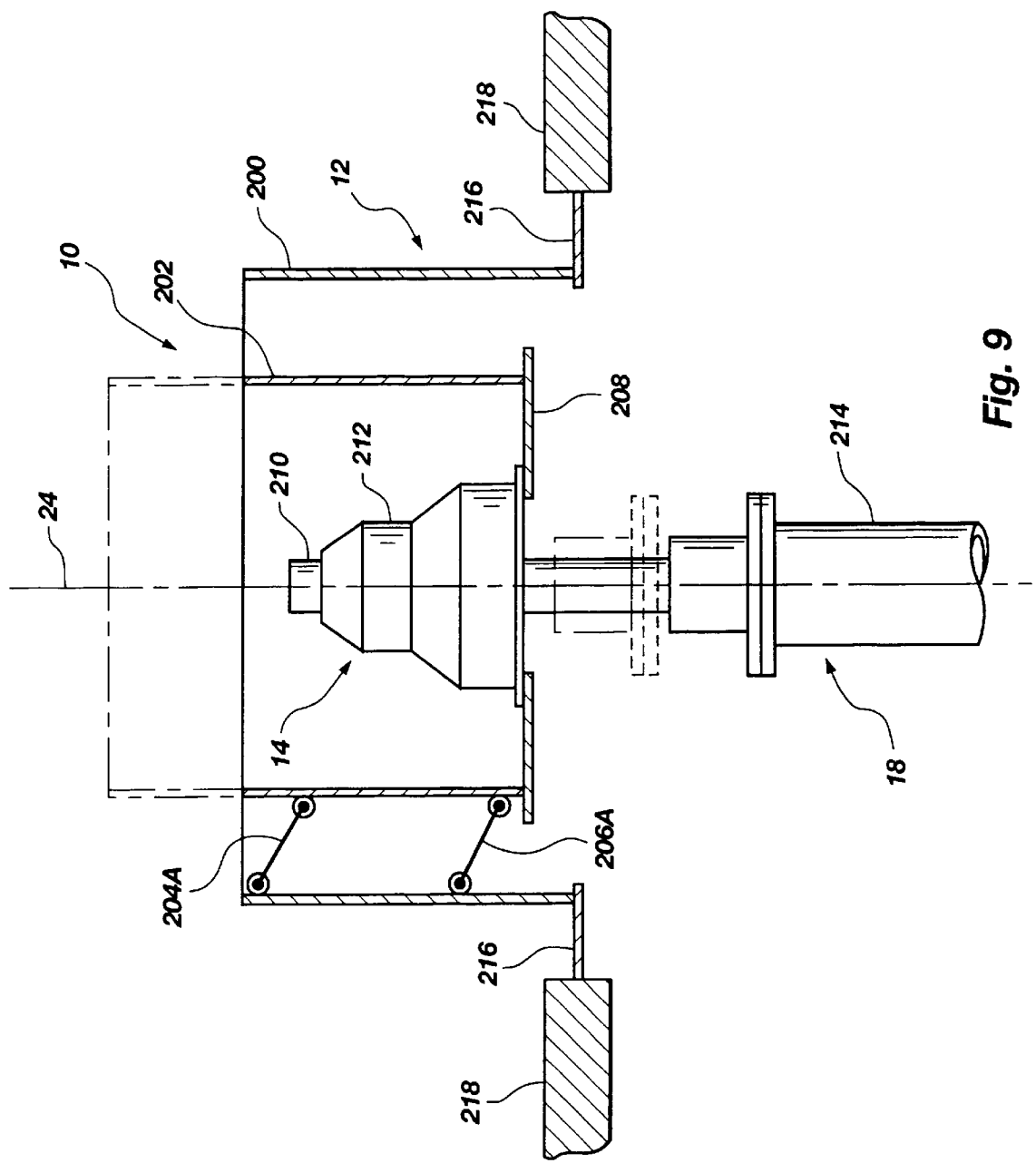
FIG. 9 is a side view of the aspect of the invention shown in FIG. 8.

As shown in FIGS. 8 and 9, a first aspect of the second general embodiment of the invention includes an outer body 200 and an inner body 202, the outer and inner bodies being joined by link arms 204A, 204B, 204C and 206A, 206B, 206C. The inner body 202 is substantially hollow and has an annular base 208. A rotary drive mechanism 14 is located within the inner body 202 and is fixedly mounted on the annular base 208. The rotary drive mechanism 14 includes a rake drive motor 210 and a rake drive gearbox 212. A rake drive shaft 214 extends downwardly from the rake drive motor 210 through the annular base 208. The outer body 200 has an annular flange 216 which may be secured to a support, such as a bridge 218. The outer body 200, in this embodiment, serves as a stationary support 12 for pivotal securement of the linkage mechanism 16 to the rotary drive mechanism 14.

Figure 10:
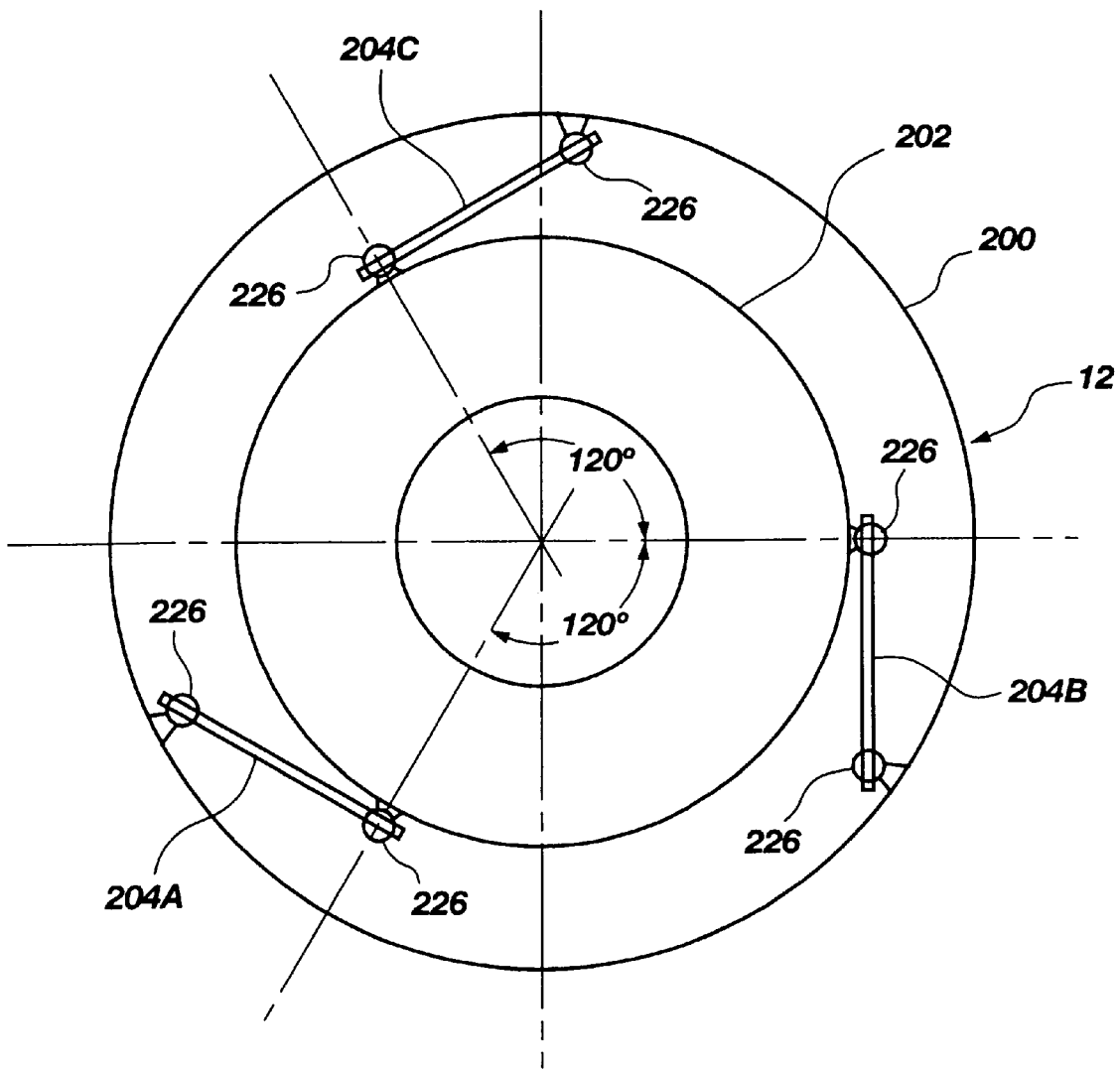
FIG. 10 is a plan view of the aspect of the invention shown in FIG. 8.

As more clearly shown in FIG. 10, the link arms 204A–C (link arms 206A–C are not shown in FIG. 10) are radially separated from each adjacent link arm 204, 204B, 204C by 120°. Link arms 206A–C are oriented in the same way as link arms 204A–C. Link arms 206A–C are displaced in an axial (i.e., vertical) direction from link arms 204A–C and are preferably parallel thereto.

Figure 11:
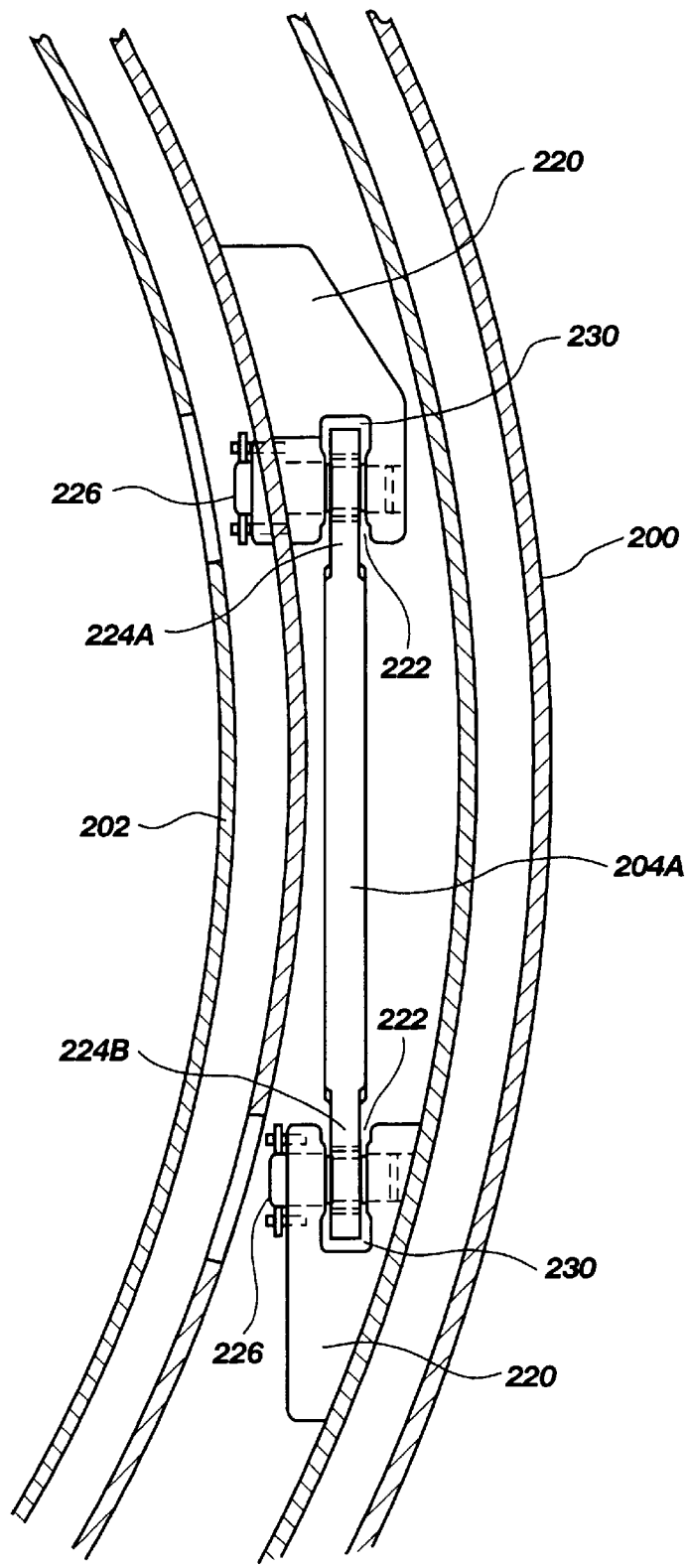
FIG. 11 is a plan view, in greater detail, of a portion of the aspect of the invention shown in FIG. 10.
Figure 13:
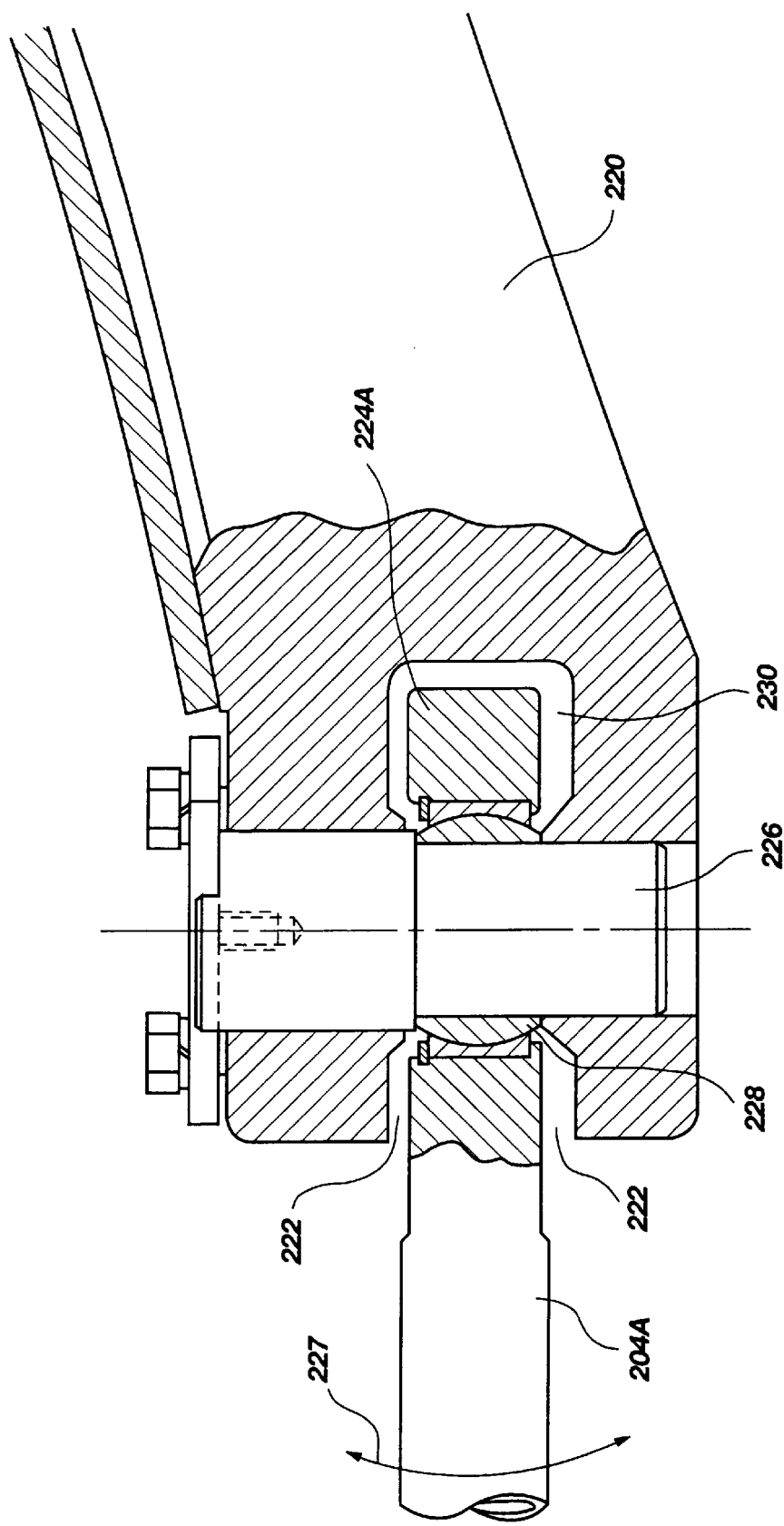
FIG. 13 is a plan view of a connection between a link arm and an inner body of an aspect of the second embodiment of the invention.

As more clearly shown in FIGS. 11 and 13, each link arm 204A–C and 206A–C (only 204A is shown) is connected, at its ends, to the respective outer body 200 and inner body 202 by means of supporting brackets 220. Each supporting bracket 220 has a recess 222 for receiving a respective end 224A, 224B of the relevant link arm 204A. Each recess 222 is sized to allow rotational (i.e., pivotal) movement of the end 224A, 224B of the link arm 204A within the recess 222. The link arms 204A, 204B are secured to the brackets 220 by means of pins 226 about which the link arms 204A, 204B may pivotally rotate about a horizontal axis. The connection between the ends 224A, 224B of the link arms 204A and the pins 226 is by way of a spherical plane bearing assembly 228 which allows the link arm 204A to move laterally, indicated by arrow 227, relative to the pin 226 to accommodate the slight twisting, or rotational, motion of the inner body 202 relative to the outer body 200 as the inner body 202 moves in an axial (i.e., vertical) direction relative to outer body 200. To allow for this lateral movement of each link arm 204A, 204B there is a small space 230 between the ends 224A, 224B of each link arm 204A and the sides of each recess 222 of the brackets 220.

Lifting mechanisms, such as hydraulic cylinders (FIG. 12), can be employed to raise and lower the rotary drive mechanism 14. In use, the inner body 202 can be raised or lowered relative to the outer body 200 by means of the lifting mechanism 20. As the inner body 202 moves up or down relative to the outer body 200, the link arms 204A–C and 206A–C rotate about the pins 226. As the link arms 204A–C and 206A–C rotate, the inner body 202 rotates, or twists, slightly about its axis 24. This also causes the end of each link arm 204A–C and 206A–C which is connected to the inner body 202 to undergo some degree of lateral movement towards or away from the outer body 200.

Figure 12:
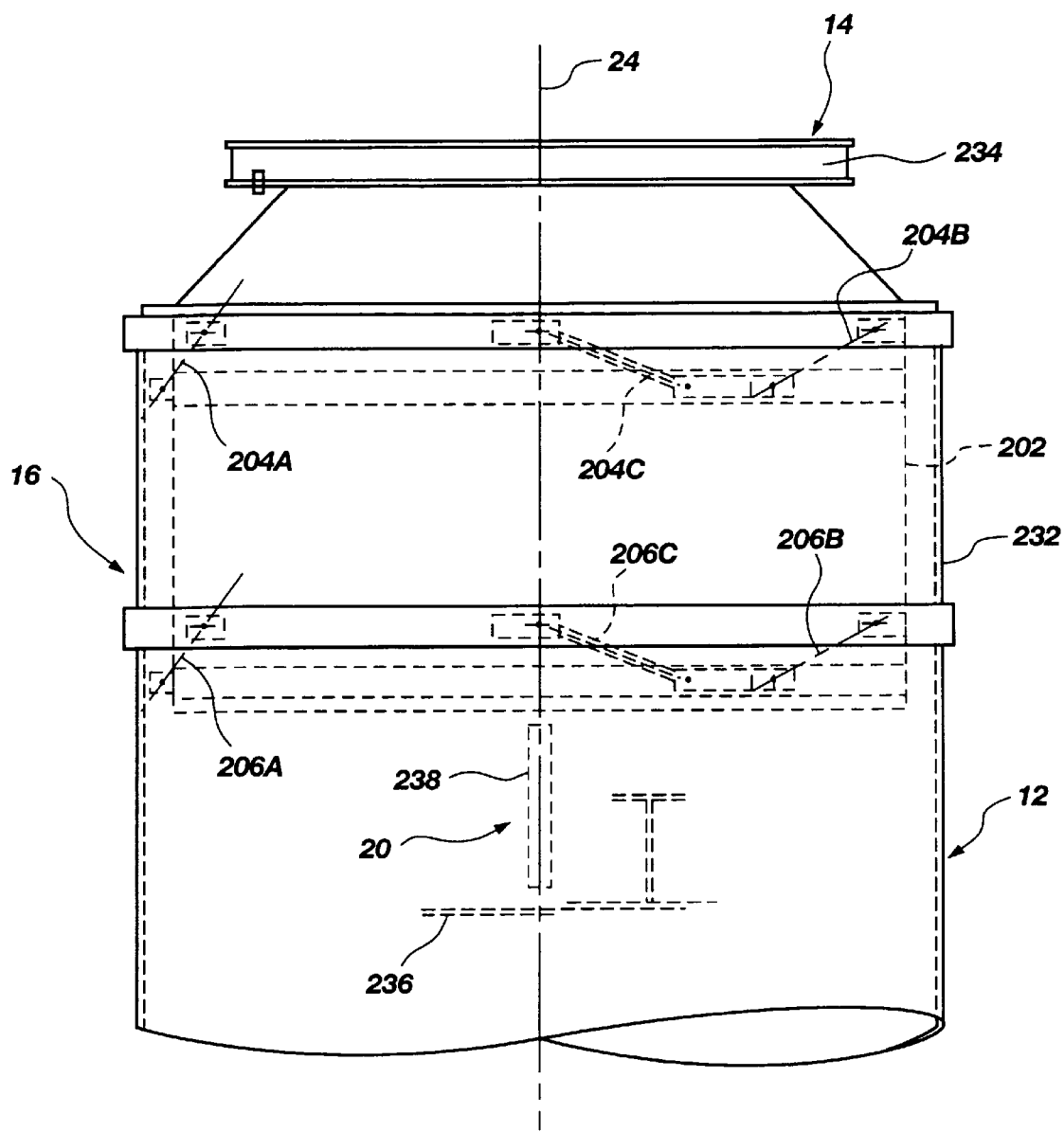
FIG. 12 is a side view of an alternative aspect of the second general embodiment of the invention.

An alternative aspect of the invention is shown in FIG. 12 which illustrates a fixed hollow central column 232 and a movable inner body 202. The column 232 may be fixed to a floor of a tank or reservoir. The positions of the link arms 204A–C and 206A–C are shown in phantom. The rotary drive mechanism 14 (not fully shown), including the rake drive gearbox 234, is located on top of the inner body 202. In this aspect of the invention, rake arms, or an external cage with rake arms extending therefrom (not shown in FIG. 12), are joined to the rotary drive mechanism 14. The hollow central column 232 has a horizontal support plate 236 on which is mounted the lifting mechanism 20 or hydraulic cylinders 238 (only one is shown) for raising and lowering the inner body 202 relative to the central column 232. In the above alternative aspect of the invention, the operation of the link arms 204A–C and 206A–C is substantially identical to their operation described in relation to the other aspects of the second general embodiment of the invention described above.

Figure 14:
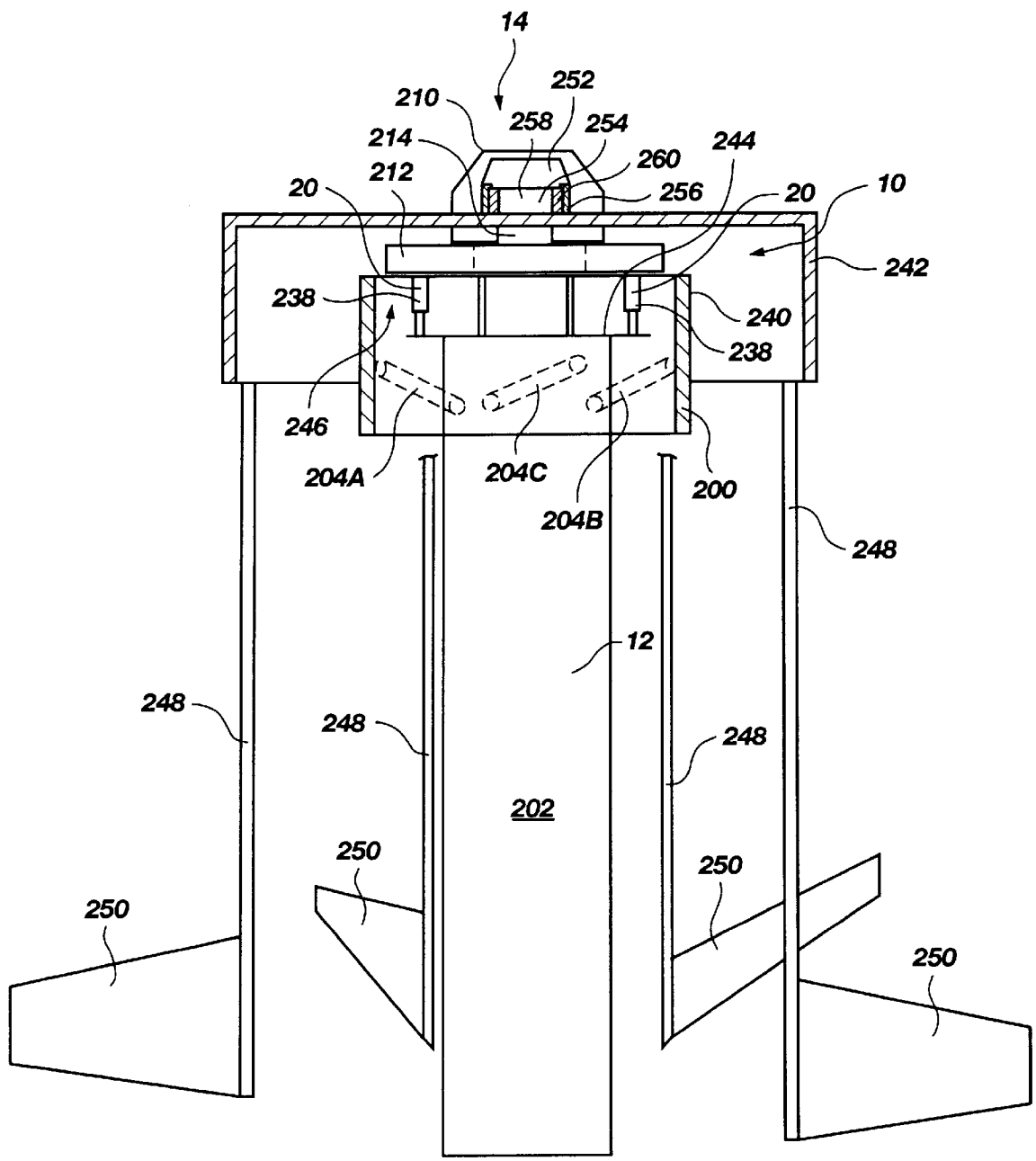
FIG. 14 is a representational illustration of a third aspect of the second embodiment of the invention where the outer body is the stationary support and the inner body is associated with the rotary drive mechanism.

In a further alternative aspect of the invention, shown in FIG. 14, the inner body 202 may be fixed (i.e., the stationary support 12) and the outer body 200 may be movable in an axial (i.e.,including the rake d. In this case, the rotary drive mechanism, 14, including the rake drive motor 210 and rake drive gear box 212, may be connected to the outer body 200. The inner body 202 may be a cylindrical column and the outer body 200 may be a hollow cage 240 to which is secured the rotary drive mechanism 14. In this case, the rotary drive mechanism 14 may include a drive cage 242 about the hollow cage 240. In this alternative aspect of the invention, the lifting and guiding assembly 10 may include lifting mechanism 20, such as one or more hydraulic cylinders 238, located between an upper section 244 of the inner body 202 and a portion 246 of the outer body 200. The drive cage 242 discussed above may preferably include one or more elongated vertical legs 248. Although the number of such legs 248 may vary according to the desired application, four such legs 248 have been found to be a particularly suitable number. A rake arm 250 may be attached to each of the vertical legs 248, the rake arm 250 extending transverse to the direction of the legs 248 in order to facilitate mixing or thickening of a liquid or slurry. The rotary drive assembly 14 may include a rake drive motor 210 and rake drive gear box 212 to enable the drive shaft 214 of the drive cage 242 to be rotated over a wide range of speeds. Where the rotary drive mechanism 14 includes a drive cage 242, the rotary drive mechanism 14 will preferably include a main gear box 252 and a pinion gear box 254. The main gear box 252 preferably has an outer rotating section 256 which is attached to an inner stationary section 258 of the main gear box 252 by means of a bearing assembly 260. Under the action of the pinion gear box 254, the outer rotating section 256 of the main gear box 252 is caused to rotate, thereby rotating the drive cage 242. By virtue of the simultaneous action of the pinion gear box 254 and the lifting mechanism 20, the drive cage 242 can be rotated and lifted at the same time.

Third General Embodiment of the Invention

Figure 15:
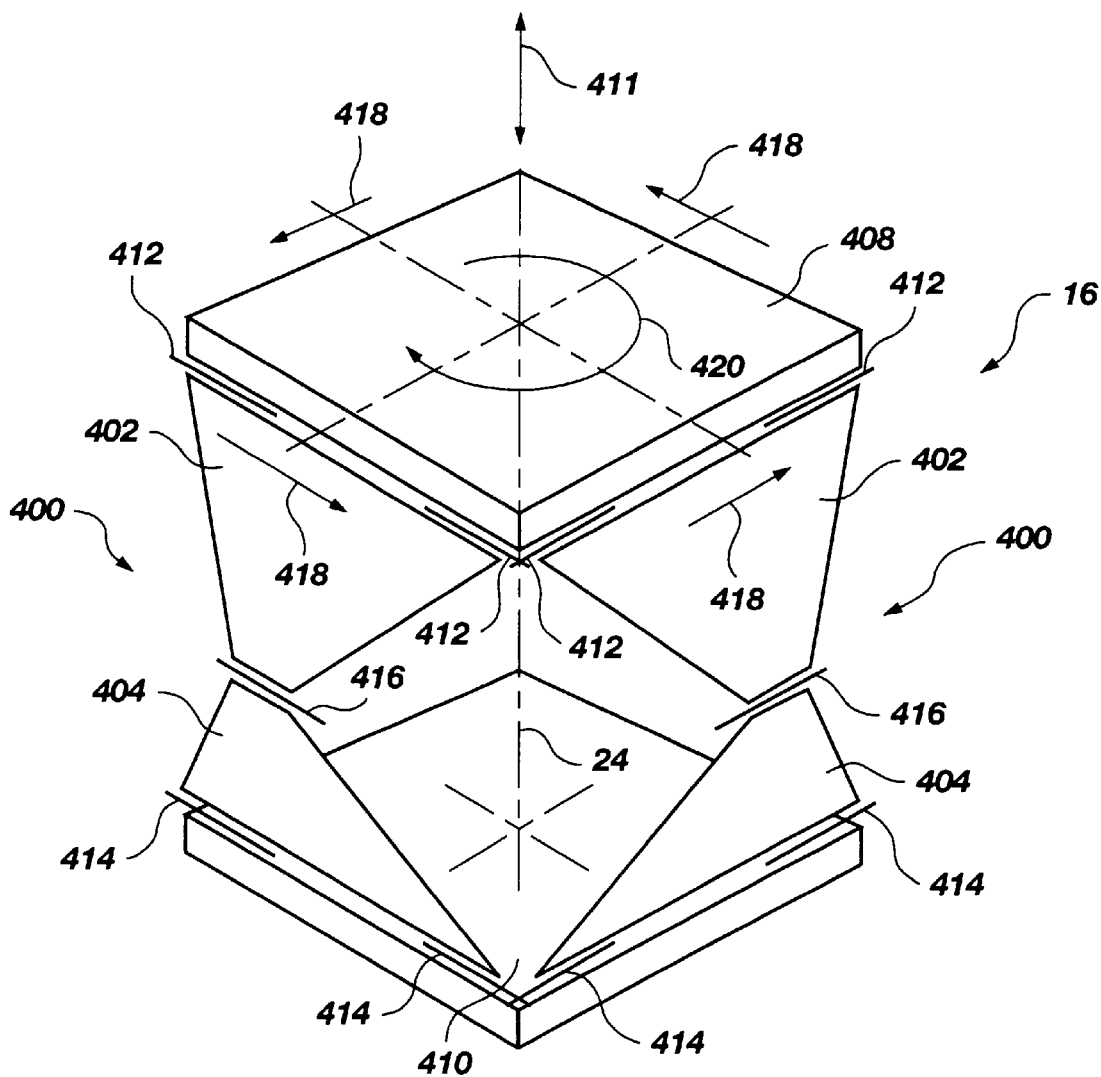
FIG. 15 is a perspective view of a schematic representation of the linkage of the invention in a third general embodiment thereof.

The general linkage structure 16 of the third general embodiment of the invention is schematically illustrated in FIG. 15 and explains the general concept of the lifting and guiding mechanism assembly 10, illustrating the orientation of the pivotal connections and the translation of torque forces to the lifting and guiding mechanism assembly 10. Notably, the lifting and guiding mechanism assembly 10 shown in FIG. 15 is a preferred construction which comprises interconnected elongate members 400 further comprising an upper planar hinge plate 402 and a lower planar hinge plate 404. The configuration of the hinge plates 402, 404 is described and illustrated more fully hereinafter. In general, however, the upper hinge plate 402 is pivotally connected to an upper support surface 408 and the lower hinge plate 404 is pivotally connected to a lower support surface 410. As previously described, the upper support surface 408 may be connected to or is part of, for example, the rotary drive mechanism 14 or a portion of the rake assembly 18. Further, the upper support surface 408 may be stationary, or may rotate in some embodiments. Similarly, the lower support surface 410 may be, for example, the bridge of the tank, a central column or pier or a portion of the rake assembly 18. The lower support surface 410 may be stationary, or it may rotate in some embodiments. The upper support surface 408 remains in substantially parallel orientation to the lower support surface 410 at all times during vertical movement, in the direction of arrow 411, to increase or decrease the vertical distance between the upper support surface 408 and the lower support surface 410.

The upper hinge plate 402 is pivotally connected to an upper support surface 408 in a manner which provides movement of the upper hinge plate 402 relative to the upper surface 408 about a horizontal axis. For example, the upper hinge plate 402 may be connected to the upper support surface 408 by one or more upper hinge pins 412. Two upper hinge pins 412 may be preferred. Likewise, the lower hinge plate 404 is pivotally connected to the lower support surface 410 in a manner which provides movement of the lower hinge plate 404 about a horizontal axis, and the lower hinge plate 404 may be connected by one or more lower hinge pins 414 to the lower support surface 410. Two lower hinge pins 414 may be preferred.

The upper hinge plate 402 and the lower hinge plate 404 are, in turn, pivotally connected to each other so as to move relative to each other about a horizontal axis and, therefore, may be connected by one or more middle hinge pins 416. As constructed, the hinge pins 412, 414, 416 are oriented parallel to the torque forces, represented by arrows 418, which are imposed on the assemblage by rotation of the rake assembly about a vertical axis, corresponding to the vertical center line 24 of the tank, in the direction of rotation, shown by arrow 420, of the rake arms. As explained more fully hereinafter, the torque forces are translated to the pivotal connections of the lifting and guiding mechanism 10 and the forces are effectively counteracted by the construction and orientation of the lifting and guiding mechanism assembly 10.

The linkage mechanism 16 shown in FIG. 15 suggests the employment of four elongate members 400 in the mechanism, comprising the attachment of four upper hinge plates 402 to the upper support surface 408 and also connected to four corresponding lower hinge plates 404 which are attached to a lower support surface 410. However, in practice, one or more elongate members 400 may be employed in the linkage mechanism 16 to raise and lower the upper support surface 408 relative to the lower support surface 410, or vice versa as explained further below. It is also preferred that the linkage mechanism 16 include a vertical guide member to aid in maintaining the upper support surface 408 and lower support surface 410 in substantially parallel orientation relative to each other, as described further below.

FIGS. 16–19 illustrate schematically four different ways of structuring the lifting and guiding mechanism assembly 10 of the present embodiment to translate torque forces into the linkage mechanism 16 while effecting vertical movement of the rake assembly 18 within the tank 22. The basic structural elements of the tank 22 and lifting and guiding mechanism assembly 10 are shown in FIGS. 16–19 where like elements are designated with like reference numerals. The lifting or actuation mechanism 20 is eliminated from FIGS. 16–19 for the sake of clarity.

Figure 16:
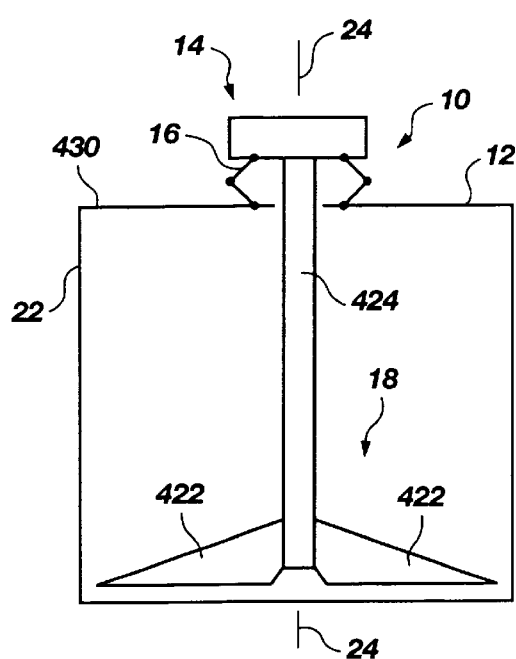
FIG. 16 is a schematic representation of a first aspect of the third general embodiment of the invention illustrating exemplar connection of the linkage mechanism.
Figure 17:
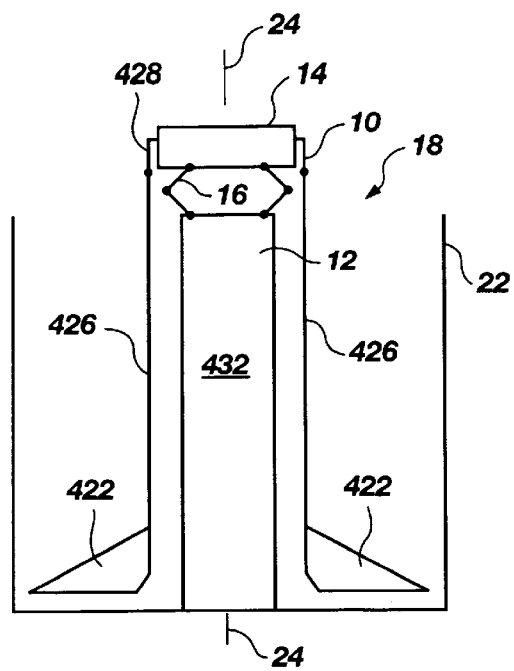
FIG. 17 is a schematic representation of a second aspect of the third general embodiment of the invention illustrating another exemplar connection of the linkage.
Figure 18:
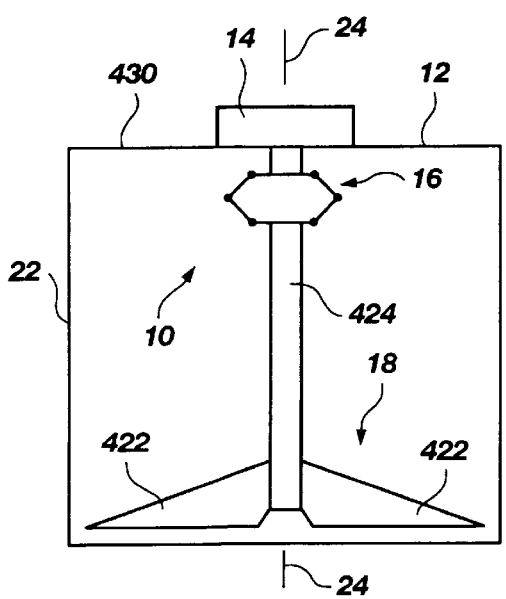
FIG. 18 is a schematic representation of a third aspect of the third embodiment of the invention illustrating yet another exemplar connection of the linkage.
Figure 19:
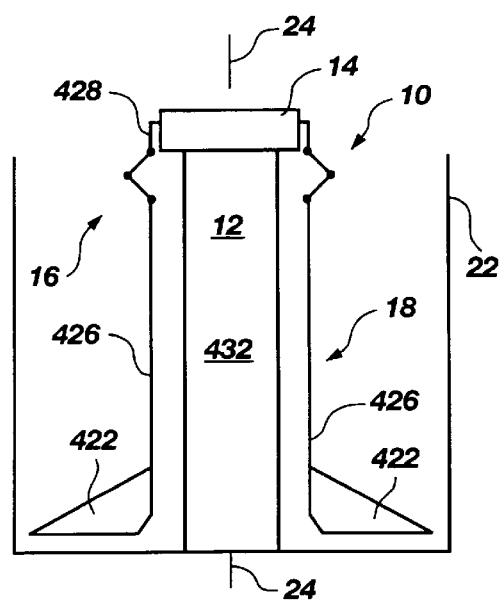
FIG. 19 is a schematic representation of a fourth aspect of the third embodiment of the invention illustrating an alternative connection to the linkage.

Generally, the lifting and guiding mechanism assembly 10 is associated with a tank 22, such as a sedimentation tank, in which a rake assembly 18 is positioned and generally disposed about a vertical center line 24 of the tank 22. The rake assembly 18 includes rake arms 422 which are positioned, during typical operation, near the floor of the tank 22 to contact and move settled solids therein. The rake assembly 18 may also include a rake drive shaft 424, as shown in FIGS. 16 and 18, which connects to the rake arms 422. Alternatively, the rake assembly 18 may include vertical legs 426, as shown in FIGS. 17 and 19, which extend from a drive cage 428 to the rake arms 422. The drive cage 428 is connected to an output gear of the rotary drive mechanism 14 to impart rotation to the rake arms 422.

The linkage mechanism 16 of the present embodiment is connected at one end to a stationary support 12 of the assemblage and at the other end to the rotary drive mechanism 14. Alternatively, the linkage mechanism 16 may be interconnected between the rotary drive mechanism 14 and the rake assembly 18, in which case the linkage mechanism 16 rotates with the rake assembly 18. The linkage mechanism 16, therefore, is positioned to receive torque forces from the rotating portions of the assemblage (i.e., the rake assembly 18 and, perhaps, the rotary drive mechanism 14) and to transfer those forces to the stationary support 12. The linkage mechanism 16 is also positioned to impart vertical movement to the rake assembly 18 to lift the rake arms 422.

In a first embodiment of the lifting and guiding mechanism assembly 10 shown in FIG. 16, the linkage mechanism 16 is attached to a bridge 430, which provides a stationary support 12 for the lifting and guiding mechanism assembly 10, and to the rotary drive mechanism 14. In this embodiment, the rake drive shaft 424 is connected to an output gear (not shown) of the rotary drive mechanism 14 which imparts rotation to the rake assembly 18. The linkage mechanism 16 remains stationary (i.e., non-rotational) during operation. Torque forces are transmitted into the pivotal connections of the linkage mechanism 16 and to the stationary support 12 while the linkage mechanism 16 also imparts vertical lift to the rake assembly 18.

In an alternative embodiment shown in FIG. 17, the linkage mechanism 16 is pivotally connected at one end to a column 432 or pier positioned in the center of the tank 22 and extending up from the floor of the tank 22. The column 432 provides a stationary support 12 for the linkage mechanism 16. The linkage mechanism 16 is also pivotally connected to the rotary drive mechanism 14, to which is attached a rotatable drive cage 428. An output gear of the rotary drive mechanism 14 imparts rotation to the rotatable drive cage 428 and, thus, to the rake arms 422. Torque forces are transmitted to the pivotal connections of the linkage mechanism 16 from the rake assembly 18 and rotary drive mechanism 14 while the pivotal connections of the linkage mechanism 16 impart vertical lift to the rotary drive mechanism 14 and attached rake assembly 18. In this embodiment, the linkage mechanism 16 is stationary (i.e., non-rotational).

In another alternative embodiment shown in FIG. 18, the rotary drive mechanism 14 is secured to a bridge 430 which spans the tank 22 and provides stationary support 12 for the linkage mechanism 16. The linkage mechanism 16 is pivotally connected at one end to the rotary drive mechanism 14 and pivotally connected at the other end to the rake drive shaft 424 of the rake assembly 18. The linkage mechanism 16 is actually connected to the output gear (not shown) of the rotary drive mechanism 14 which imparts rotation to the drive shaft 424. In this embodiment, therefore, the linkage mechanism 16 rotates with the rake assembly 18. Torque forces from the rotating rake assembly 18 are transmitted through the linkage mechanism 16 and to the stationary support 12, and the pivotal connections of the linkage mechanism 16 impart vertical lift to the rake assembly 18.

In still another alternative embodiment shown in FIG. 19, the rotary drive mechanism 14 is secured to a column 432 which provides stationary support 12 to the lifting and guiding mechanism assembly 10. The linkage mechanism 16 is pivotally connected at one end to a drive cage 428 connected to the output gear of the rotary drive mechanism 14, which imparts rotation to the rake assembly 18. The linkage mechanism 16 is also pivotally connected at the other end thereof to the rake assembly 18 or, as illustrated, the vertical legs 426. In this embodiment, the linkage mechanism 16 rotates with the rake assembly 18 to which it is attached. Torque forces are transmitted to all of the pivotal connections of the linkage mechanism 16 and to the rotary drive mechanism 14 secured to the stationary support 12.

Figure 20:
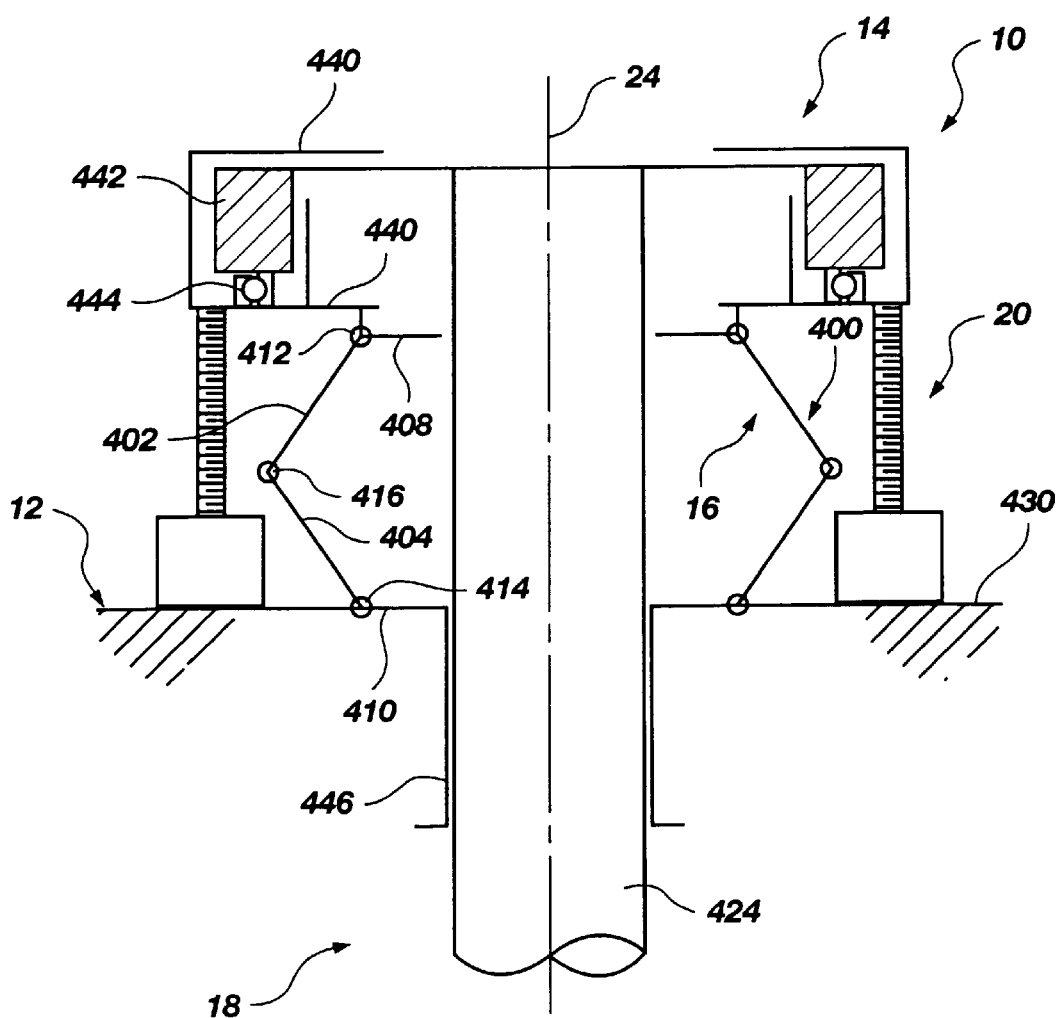
FIG. 20 is a partial view in elevation showing greater detail of a lifting mechanism assembly as shown schematically in FIG. 16.

A more detailed illustration of the four aspects of the third general embodiment shown in FIGS. 16–19 is shown in FIGS. 20–23, respectively. In FIG. 20, which corresponds to the configuration schematically shown in FIG. 16, the linkage mechanism 16 is pivotally connected to the rotary drive mechanism 14 and to a bridge 430 which spans the diameter of the tank. The linkage mechanism 16 may, for example, comprise at least one upper hinge plate 402 which is pivotally connected by upper hinge pin 412 to the rotary drive mechanism 14. The upper hinge plate 402 is actually connected to a portion of the drive housing 440 of the rotary drive mechanism 14, which serves as an upper support surface 408. The linkage mechanism 16 may also comprise at least one lower hinge plate 404 which is pivotally connected by lower hinge pin 414 to a portion of the bridge 430, which serves as a lower support surface 410.

A drive shaft 424 is connected to the output gear 442 of the rotary drive mechanism 14 which rotates relative to the drive housing 440 by means of a bearing assembly 444 interconnecting the output gear 442 to the drive housing 440. The drive shaft 424 extends upwardly through the bridge 430 and may preferably have a vertical guide member 446 positioned thereabout to guide the drive shaft 424 as it is vertically raised or lowered by the lifting mechanism 20. The vertical guide member 446 is preferably stationary. A lifting or actuation mechanism 20 may be positioned between the bridge 430 and the rotary drive mechanism 14 to raise and lower the latter relative to the former. The lifting mechanism 20 may be any suitable device, such as a mechanical or hydraulic lift.

The configuration shown in FIG. 20 is illustrated in a raised position with the upper hinge plates 402 spaced apart from the lower hinge plates 404. That is, during normal operation of the rake assembly when the rake arms are positioned at the bottom of the tank, the upper hinge plate 402 will be in adjacent registration to the lower hinge plate 404. When the rake assembly 18 is to be lifted, the lower hinge plate 404 rotates about the lower hinge pins 414, which are fixed, and the upper hinge plate 402 rotates relative to the lower hinge plate 404 about middle hinge pin 416 until the upper hinge plate 402 is spaced from the lower hinge plate 404. Although two elongate members 400 are shown, the linkage mechanism 16 may employ one to four, or more, such elongate members 400. As the drive shaft 424 is raised from the tank, the torque forces are transferred through the drive shaft 424, into the rotary drive mechanism 14, then into the linkage mechanism 16 and into the stationary support 12. Side forces imposed on the drive shaft 424 are effectively transferred to the vertical guide member 446 and into the stationary support 12. Vertical forces, or the dead load, are transferred through the drive shaft 424 into the rotary drive mechanism 14 and into the lifting mechanism 20 as the rake assembly 18 is raised.

Figure 21:
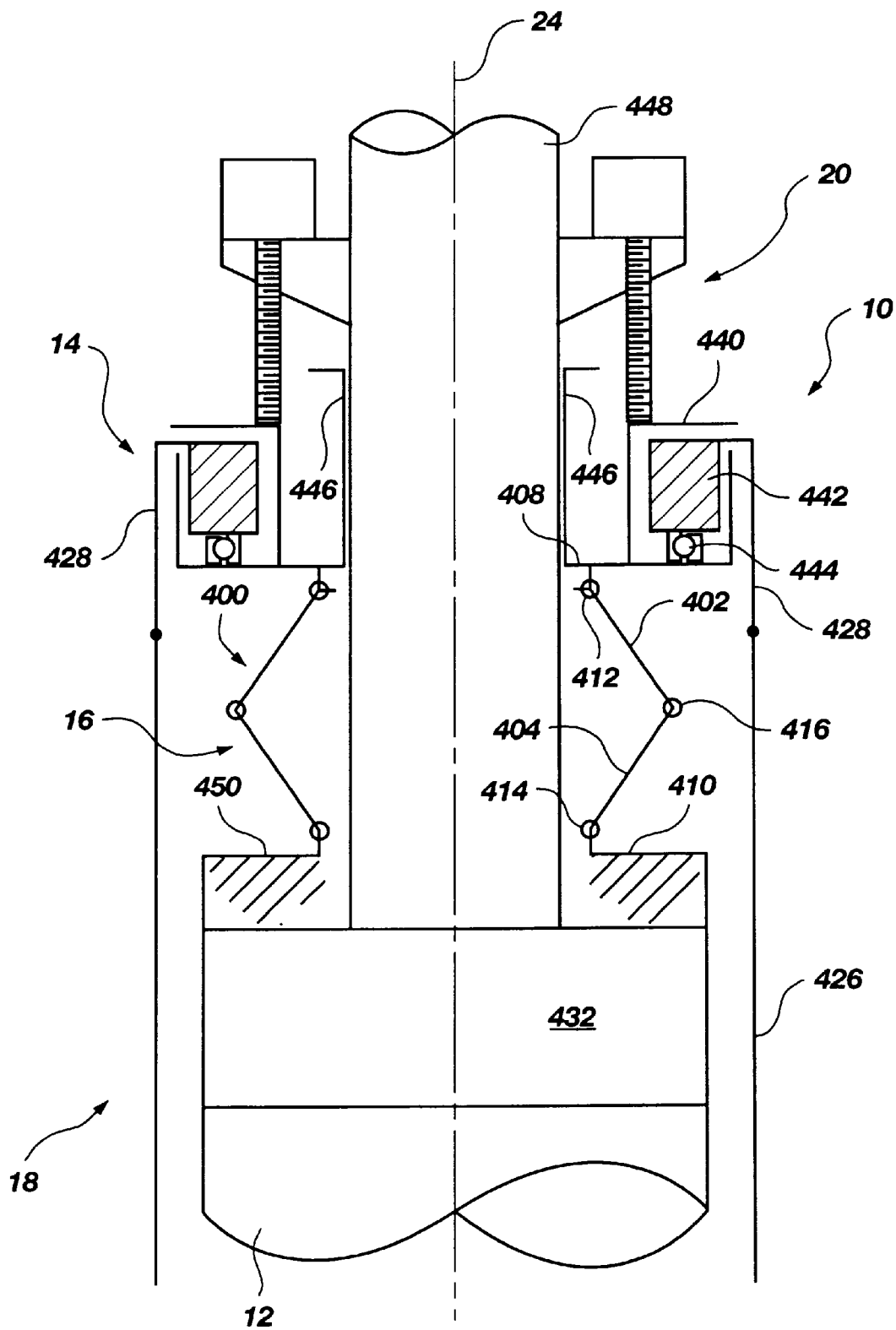
FIG. 21 is a partial view in elevation showing greater detail of a lifting mechanism assembly as shown schematically in FIG. 17.

In FIG. 21, which corresponds to the configuration schematically shown in FIG. 17, the linkage mechanism 16 is pivotally connected to the rotary drive mechanism 14 and to a column 432 which is positioned in the center of the tank, usually extending upwardly from the floor of the tank. The column 432 may include an extended portion 448 about which the rotary drive mechanism 14 is positioned. The linkage mechanism 16 may, for example, comprise at least one upper hinge plate 402 which is pivotally connected by upper hinge pin 412 to the rotary drive mechanism 14. The upper hinge plate 402 is actually connected to a portion of the drive housing 440 of the rotary drive mechanism 14, which serves as an upper support surface 408. The linkage mechanism 16 may also comprise at least one lower hinge plate 404 which is pivotally connected by lower hinge pin 414 to an upper horizontal surface 450 of the column 432 which serves as a lower support surface 410 for the linkage mechanism 16.

A drive cage 428 is connected to the output gear 442 of the rotary drive mechanism 14 which rotates relative to the drive housing 440 by means of a bearing assembly 444 interconnecting the output gear 442 to the drive housing 440. The drive cage 428 is connected to vertical legs 426 which extend into the tank and to which the rake arms 422 (FIG. 17) are attached. The drive cage 428 and vertical legs 426 rotate generally about the column 432. The drive housing 440 may preferably have a vertical guide member 446 which is positioned about the extended portion 448 of the column 432 to guide the rotary drive mechanism 14 as it is vertically raised or lowered by the lifting mechanism 20. The drive housing 440 and vertical guide member 446 are stationary (i.e., they do not rotate) while the output gear 442 rotates the drive cage 428.

A lifting or actuation mechanism 20 may be secured to the extended portion 448 of the column 432 above the rotary drive mechanism 14 and may be positioned to raise and lower the rotary drive mechanism 14 relative to the column 432 (i.e., stationary support 12). The lifting or actuation mechanism 20 may be any suitable device, such - as a mechanical or hydraulic lift. Other lifting devices may be used.

The configuration shown in FIG. 21 is illustrated in a raised position with the upper hinge plates 402 spaced apart from the lower hinge plates 404. Again, during normal operation of the rake assembly when the rake arms are positioned at the bottom of the tank, the upper hinge plate 402 will be in adjacent registration to the lower hinge plate 404. When rotary drive mechanism 14 and the rake assembly 18 are to be lifted, the lower hinge plate 404 rotates about the lower hinge pins 414, which are fixed, and the upper hinge plate 402 rotates relative to the lower hinge plate 404 about middle hinge pin 416 until the upper hinge plate 402 is spaced from the lower hinge plate 404. Although two elongate members 400 are shown, the linkage mechanism 16 may employ one to four, or more, such elongate members 400. As the rotary drive mechanism 14 is raised, thereby raising the drive cage 428 and the vertical legs 426, the torque forces are transferred through the vertical legs 426 and drive cage 428, into the rotary drive mechanism 14, then into the linkage mechanism 16 and into the stationary support 12 (i.e., column 432). Side forces imposed on the rake assembly 18 are effectively transferred through the drive cage 428 to the rotary drive mechanism 14, to the vertical guide member 446 and into the stationary support 12 (i.e., extended portion 448 of the column 432). Vertical forces, or the dead load, are transferred through the rake assembly 18, into the rotary drive mechanism 14, into the lifting mechanism 20, then into the stationary support 12 (i.e., the extended portion 448 of the column 432 and the column 432).

Figure 22:
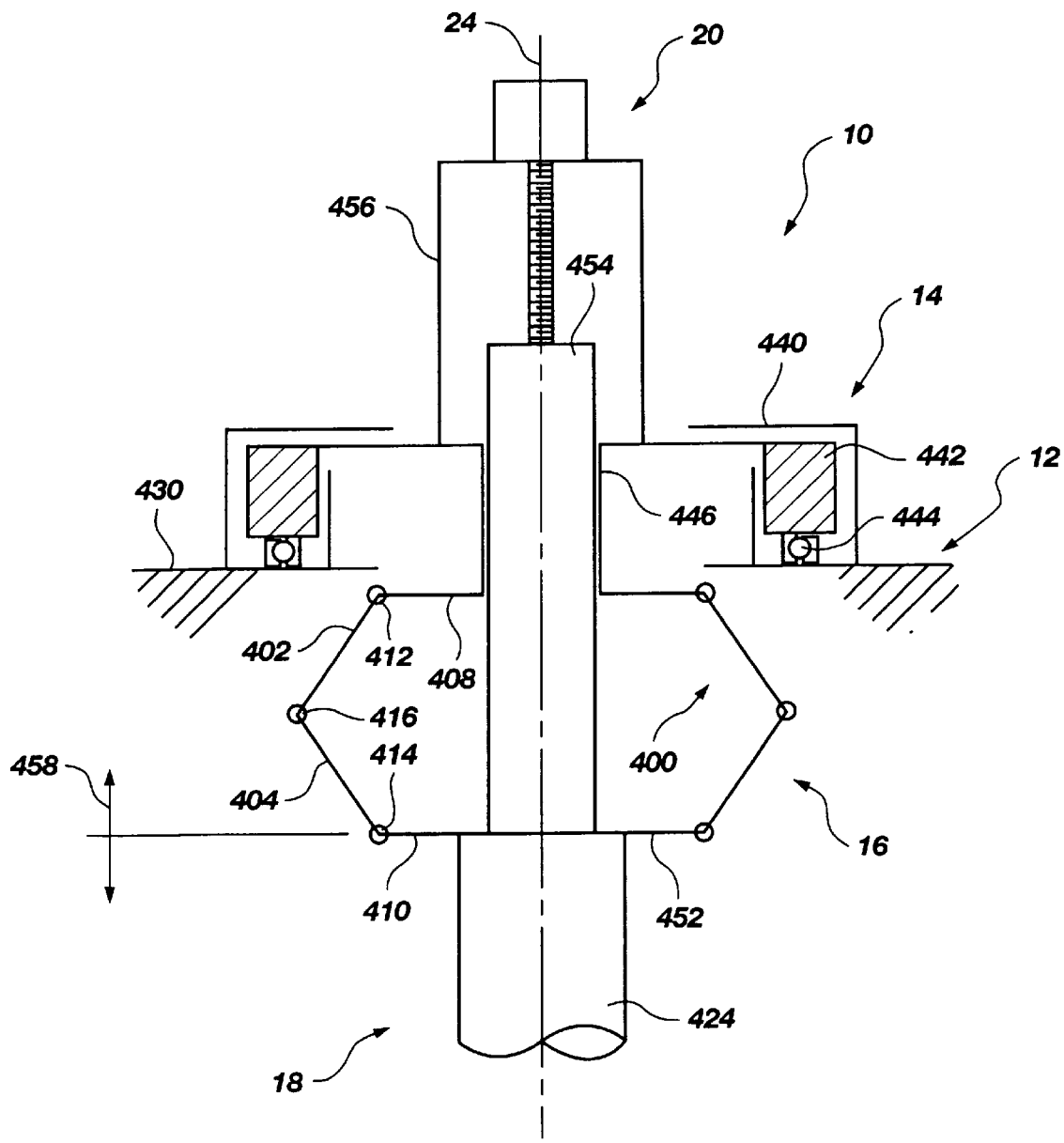
FIG. 22 is a partial view in elevation showing greater detail of a lifting mechanism assembly as shown schematically in FIG. 18.

In FIG. 22, which corresponds to the configuration schematically shown in FIG. 18, the rotary drive mechanism 14 is secured to a bridge 430 spanning the tank, which serves as a stationary support 12 for the lifting and guiding mechanism assembly 10. The linkage mechanism 16 is pivotally connected to the rotary drive mechanism 14 and pivotally connected to the rake assembly 18. More specifically, the linkage mechanism 16 is shown comprised, for example, of at least one upper hinge plate 402 which is pivotally connected by upper hinge pin 412 to a portion of the output gear 442 of the rotary drive mechanism 14, which serves as an upper support surface 408. The linkage mechanism 16 is also shown comprised of at least one lower hinge plate 404 pivotally connected by lower hinge pin 414 to a horizontal flange 452 of the drive shaft 424, which serves as a lower support surface 410 of the linkage mechanism 16.

The linkage mechanism 16 is effectively connected to the output gear 442 by the upper support surface 408 and a vertical guide member 446 which is positioned about an upper extension 454 of the drive shaft 424 to guide the drive shaft 424 when raised and lowered by the lifting mechanism 20. Because the linkage mechanism 16 is connected to the output gear 442 of the rotary drive mechanism 14, it rotates about the vertical center line 24 of the tank and imparts rotation to the drive shaft 424 of the rake assembly 18.

The drive shaft 424 and rake assembly 18 are raised and lowered in the tank by operation of the lifting mechanism 20 which is connected to the upper extension 454 of the drive shaft 424 and to the output gear 442 of the rotary drive mechanism 14 by a lifting mechanism support 456. Thus, the lifting mechanism 20 in this embodiment rotates with the drive shaft 424 and rake assembly 18. Any suitable lifting mechanism may be used, such as a mechanical or hydraulic lifter, or a comparable mechanism. The configuration of the lifting and guiding mechanism assembly 10 shown in FIG. 22 is in a lowered position (i.e., the rake arms would be positioned at the bottom of the tank) because the upper hinge plate 402 is spaced apart from the lower hinge plate 404. When the drive shaft 424 and rake assembly 18 are vertically raised, in the direction of arrow 458, the lower hinge plate 404 rotates relative to the upper hinge plate 402 by pivotal rotation about middle hinge pin 416 and the lower hinge plate 404 comes into registration in parallel adjacency, with the upper hinge plate 402 which is fixed at a vertical point relative to the rotary drive mechanism 14.

Torque forces imposed on the lifting and guiding mechanism assembly 10 during simultaneous lifting and rotation of the drive shaft 424 and rake assembly 18 are transferred through the drive shaft 424, into the linkage mechanism 16, into the vertical guide member 446, then into the rotary drive mechanism 14 and into the stationary support 12 (i.e., the bridge 430). Side forces imposed on the rake assembly 18 and drive shaft 424 during operation are transferred through the drive shaft 424 (including the upper extension 454 thereof), into the vertical guide member 446, into the rotary drive mechanism 14 and into the stationary support 12. Vertical forces, or dead load, imposed by vertical raising of the drive shaft 424 and rake assembly 18 are transferred through the drive shaft 424 (including the upper extension 454 thereof), into the lifting mechanism 20, down through the lifting mechanism support 456, into the rotary drive mechanism 14 and into the stationary support 12 (i.e., bridge 430).

Figure 23:
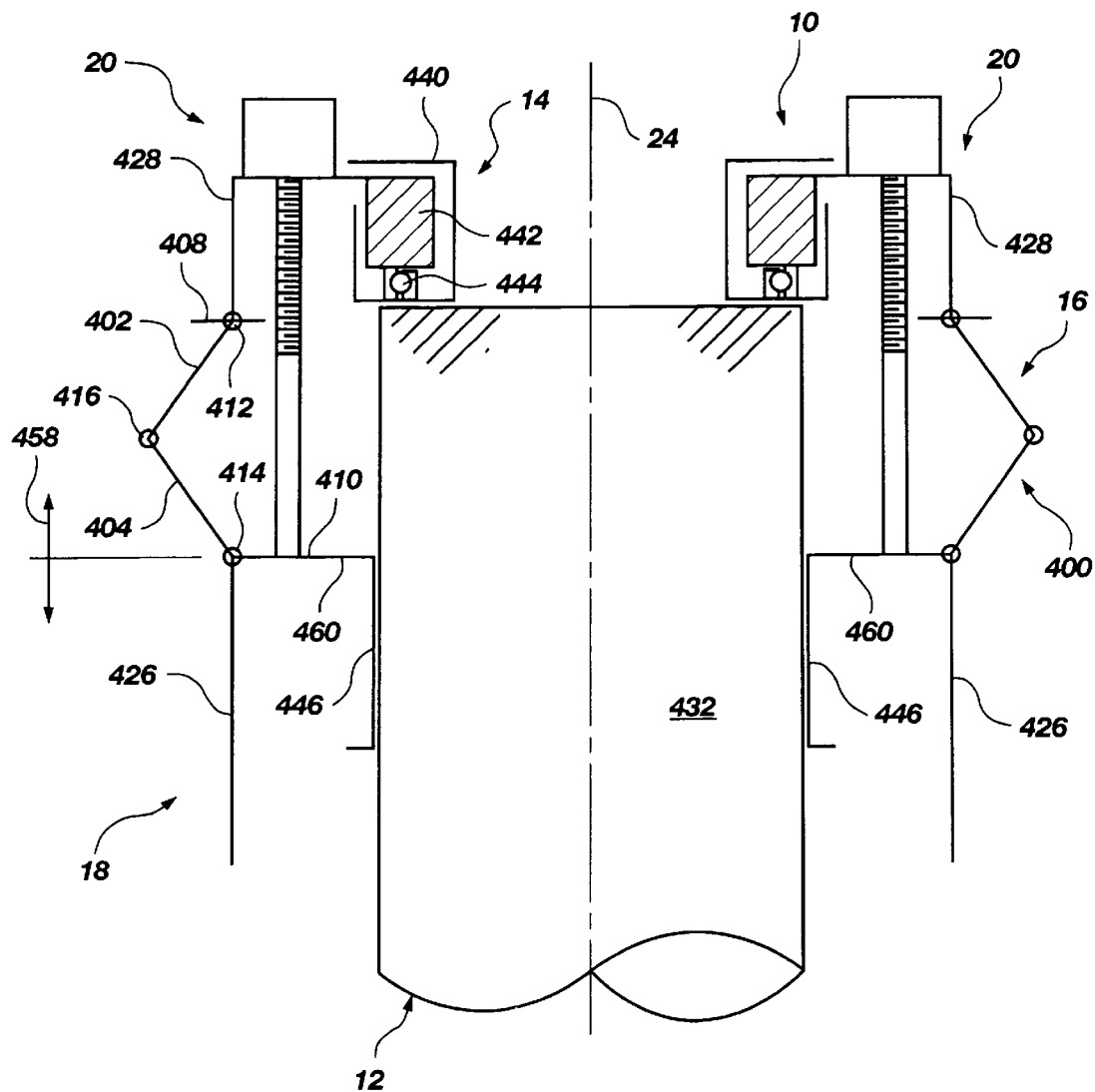
FIG. 23 is a partial view in elevation showing greater detail of a lifting mechanism assembly as shown schematically in FIG. 19.

In FIG. 23, which corresponds to the configuration schematically shown in FIG. 19, the rotary drive mechanism 14 is secured to a column 432 which is positioned along the vertical center line 24 of the tank, and which usually extends upwardly from the floor of the tank. The column 432 serves as a stationary support 12 for the lifting and guiding mechanism assembly 10. The linkage mechanism 16 is pivotally connected to the rotary drive mechanism 14 and pivotally connected to the rake assembly 18. More specifically, the linkage mechanism 16 may, for example, comprise at least one upper hinge plate 402 which is pivotally connected by upper hinge pin 412 to a drive cage 428 which is, in turn, connected to the output gear 442 of the rotary drive mechanism 14. The drive cage 428 serves as an upper support surface 408 for the linkage mechanism 16. The linkage mechanism 16 may also comprise at least one lower hinge plate 404 pivotally connected by lower hinge pin 414 to a horizontal member 460 of the rake assembly 18 to which vertical legs 426 are attached to descend into the tank. The horizontal member 460 of the rake assembly 18 serves as a lower support surface 410 of the linkage mechanism 16 and may also have associated therewith a vertical guide member 446 which is positioned at least partially about the column 432 to help guide the rake assembly 18 in its vertical movement during raising and lowering.

The linkage mechanism 16 is effectively connected to the output gear 442 by its connection to the drive cage 428 and the linkage mechanism 16, therefore, rotates about the column 432 along with the drive cage 428 and the rake assembly 18. The rake assembly 18 is raised and lowered in the tank by operation of the lifting mechanism 20 which is connected to the drive cage 428 and to the horizontal member 460 of the rake assembly 18. As such, the lifting mechanism 20 rotates with the drive cage 428, linkage mechanism 16 and rake assembly 18. Any suitable lifting mechanism 20 may be used, such as a mechanical or hydraulic lifter, or a comparable mechanism. The configuration of the lifting and guiding mechanism assembly 10 shown in FIG. 23 is in a lowered position (i.e., the rake arms would be positioned at the bottom of the tank) because the upper hinge plate 402 is spaced apart from the lower hinge plate 404. When the rake assembly 18 is vertically raised, in the direction of arrow 458, relative to the fixed rotary drive mechanism 14 by operation of the lifting mechanism 20, the lower hinge plate 404 rotates relative to the upper hinge plate 402 by pivotal rotation about middle hinge pin 416 and the lower hinge plate 404 comes into registration, in parallel adjacency, with the upper hinge plate 402, which is stationary and fixed.

Torque forces imposed on the lifting and guiding mechanism assembly 10 during simultaneous lifting and rotation of the rake assembly 18 are transferred through the rake assembly 18, into the linkage mechanism 16, into the rotary drive mechanism 14 and into the stationary support 12 (i.e., the column 432). Side forces imposed on the rake assembly 18 and rotary drive mechanism 14 during operation are transferred through the rake assembly 18, into the vertical guide member 446 and then into the stationary support 12 (i.e., the column 432). Vertical forces, or dead load, imposed by vertical raising of the rake assembly 18 are transferred through the rake assembly 18, into the lifting mechanism 20, into the rotary drive mechanism 14 and then into the stationary support 12 (i.e., column 432).

Figure 24:
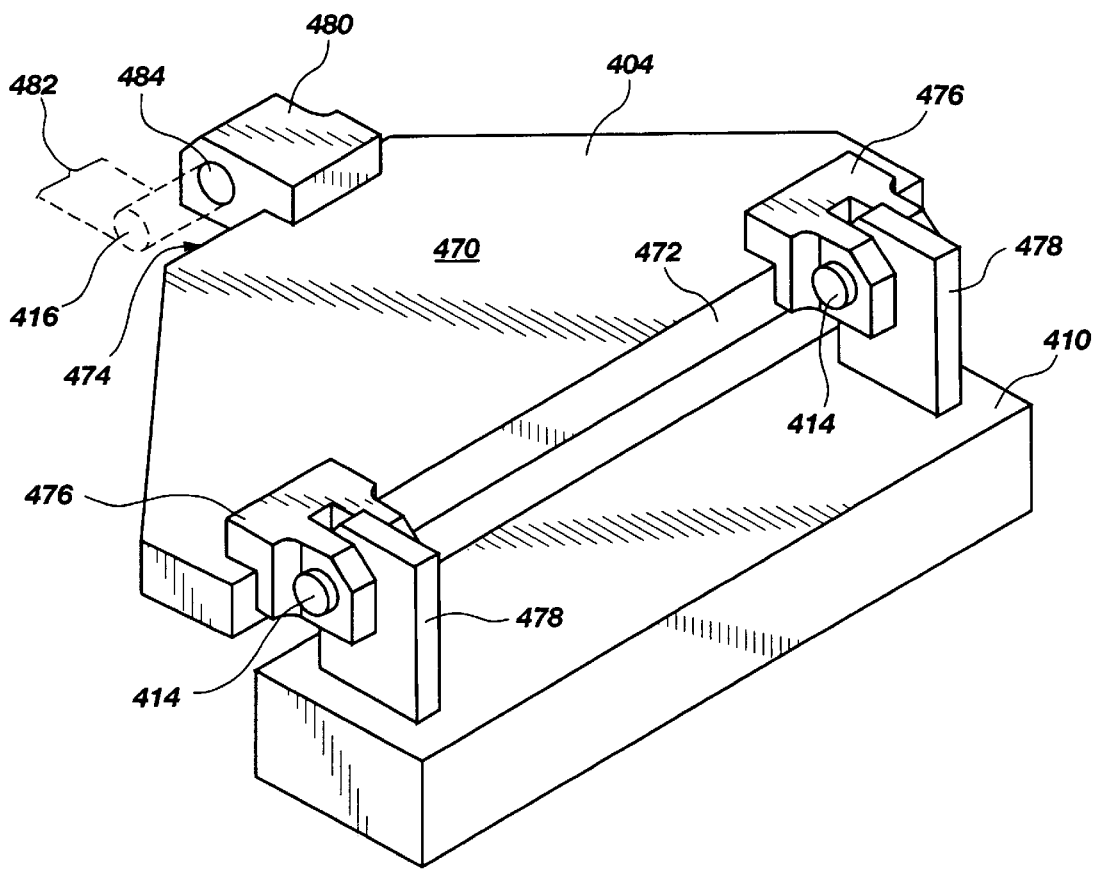
FIG. 24 is a perspective view showing greater detail of a hinge plate of the linkage assembly shown in FIG. 15.

FIG. 24 illustrates one exemplar means of structuring a hinge plate, here showing the lower hinge plate 404 as previously described. The description of the lower hinge plate 404 applies equally to the upper hinge plate, except that the upper hinge plate 402 is a mirror image of the lower hinge plate 404. The hinge plate 404 may be formed as a substantially planar member 470 having a long edge 472 spaced apart from a shorter edge 474. One or more lug members 476 may be positioned along the long edge 472 of the planar member 470 and if more than one, the lug members 476 may be laterally spaced from each other along the long edge 472. The lug members 476 are configured to interconnect with pin brackets 478 which are in equal number to the lug members 476 and positioned along the lower support surface 410. The lower hinge pins 414 extend through the lugs 476 and the pin brackets 478 to pivotally secure the lower hinge plate 404 to the lower support surface 410.

A channeled hinge bracket 480 may be positioned along the shorter edge 474 of the planar member 470 and is positioned to one end of the shorter edge 474, thereby leaving a space 482 along the shorter edge 474 where the corresponding channeled hinge bracket of the upper hinge plate may be brought into registration against the channeled hinge bracket 480 of the lower hinge plate 404. When brought into registration, the channels 484 of the respective channeled hinge brackets 480 become aligned to receive the middle hinge pin 416 (shown in phantom). Thus, the upper and lower hinge plates articulate relative to each other about the adjacently connected channeled hinge brackets 480 thereof, as earlier described. Other means of configuring the hinge plates are suitable and will be clear to one skilled in the art.

The lifting and guiding mechanism assembly of the present invention provides an improved structure for raising and lowering a rake assembly in a sedimentation tank or the like and is specifically configured for translation of torque forces to the horizontally oriented hinge pins of the linkage mechanism to thereby counteract the torque forces and provide improved lifting capabilities. The lifting and guiding mechanism assembly is also configured to reduce friction forces and/or to effectively transfer horizontal, or side forces, and vertical, or dead load, forces imposed on the lifting and guiding mechanism assembly to a stationary support. By transferring these forces into the hinged connections, less lifting power is required which may reduce capital costs in providing fewer or less powerful actuation mechanisms. The lifting and guiding mechanism assembly of the present invention may be adapted for use in any type of tank employing a rake assembly. Thus, reference herein to specific details of the illustrated embodiments is by way of example and not by way of limitation. It will be apparent to those skilled in the art that many modifications of the basic illustrated embodiments may be made without departing from the spirit and scope of the invention as recited by the claims.

What is claimed is:

1. A sedimentation tank system for settling a liquid solid slurry into a clarified liquid effluent phase and a solid underflow phase, the system comprising:
   a tank having a floor;
   a rake assembly positioned in the tank and rotatable about a vertical center line of the tank;
   a stationary support having at least one portion thereof positioned proximate the vertical center line of the tank;
   a rotary drive mechanism operably connected to the rake assembly to effect rotation thereof;
   an actuation mechanism configured to vertically lift the rotary drive mechanism with respect to the stationary support; and
   at least one linkage extending between the stationary support and the rotary drive mechanism, the at least one linkage comprising at least one elongate member pivotally mounted for rotation about a horizontal axis at one end thereof to the at least one portion of the stationary support positioned proximate the vertical center line and pivotally mounted for rotation about a horizontal axis at another end thereof to the rotary drive mechanism.

2. The system of claim 1, further comprising a vertical guide member positioned between at least a portion of the rake assembly and the stationary support to constrain non-vertical movement of the rake assembly relative to the stationary support.

3. The system of claim 2, wherein the at least one elongate member of the at least one linkage comprises an upper hinge plate pivotally secured to an upper support surface connected to said rotary drive mechanism and a lower hinge plate pivotally secured to a lower support surface connected to the stationary support, the upper hinge plate and the lower hinge plate being pivotally joined to each other at a horizontally-oriented hinge point.

4. The system of claim 3, wherein the at least one elongate member comprises a plurality of elongate members located at spaced intervals around the vertical center line of the tank.

5. The system of claim 1, wherein the stationary support includes a bridge positioned at least in part across a diameter of the tank and wherein the rotary drive mechanism is vertically movable relative to the bridge.

6. The system of claim 5, wherein the actuation mechanism is positioned between the bridge and the rotary drive mechanism.

7. The system of claim 6, wherein the rake assembly includes a drive shaft connected to and carried by the output shaft of the rotary drive mechanism, and rake arms located near the floor of the tank and extending at least partially toward an outer wall thereof.

8. The system of claim 7, further including a vertical guide member positioned about the drive shaft to constrain non-vertical movement of the drive shaft within the tank.

9. The system of claim 1, wherein the stationary support includes a column extending from the floor of the tank along the vertical center line thereof and the rotary drive mechanism is vertically movable relative to the column.

10. The system of claim 9, wherein the actuation mechanism is positioned between the column and the rotary drive mechanism.

11. The system of claim 10, wherein the rake assembly comprises a drive cage disposed about the column and extending from the rotary drive mechanism to rake arms positioned near the floor of the tank.

12. The system of claim 11, further including a vertical guide member positioned about the column constrain non-vertical movement of the rake assembly within the tank.

13. A lifting mechanism assembly for the rake assembly of a sedimentation tank, comprising:
   a rake assembly rotatable about a vertical center line;
   a stationary support proximate the vertical center line;
   a rotary drive mechanism operably connected to the rake assembly to effect rotation thereof;
   an actuation mechanism configured to vertically lift the rotary drive mechanism with respect to the stationary support; and
   at least one linkage extending between the stationary support and the rotary drive mechanism, the at least one linkage comprising at least one elongate member pivotally mounted for rotation about a horizontal axis at one end thereof to the stationary support and pivotally mounted for rotation about a horizontal axis at another end thereof to the rotary drive mechanism.

14. The lifting mechanism assembly of claim 13, further comprising a vertical guide member positioned between at least a portion of the rake assembly and the stationary support to constrain non-vertical movement of the rake assembly relative to the stationary support.

15. The lifting mechanism assembly of claim 14, wherein the at least one elongate member of the at least one linkage comprises an upper hinge plate pivotally secured to an upper support surface connected to said rotary drive mechanism and a lower hinge plate pivotally secured to a lower support surface connected to the stationary support, the upper hinge plate and the lower hinge plate being pivotally joined to each other at a horizontally-oriented hinge point.

16. The lifting mechanism assembly of claim 15, wherein the at least one elongate member comprises a plurality of elongate members located at spaced intervals around the vertical center line.

17. The lifting mechanism assembly of claim 13, wherein the stationary support includes a bridge positionable at least in part across a diameter of the tank and wherein the rotary drive mechanism is vertically movable relative to the bridge.

18. The lifting mechanism assembly of claim 17, wherein the actuation mechanism is positioned between the bridge and the rotary drive mechanism.

19. The lifting mechanism assembly of claim 18, wherein the rake assembly includes a drive shaft connected to and carried by the output shaft of the rotary drive mechanism, and rake arms secured thereto and extending substantially radially outwardly therefrom.

20. The lifting mechanism assembly of claim 19, further including a vertical guide member positioned about the drive shaft to constrain non-vertical movement of the drive shaft.

21. The lifting mechanism assembly of claim 13, wherein the stationary support includes a column extending along the vertical center line and the rotary drive mechanism is vertically movable relative to the column.

22. The lifting mechanism assembly of claim 21, wherein the actuation mechanism is positioned between the column and the rotary drive mechanism.

23. The lifting mechanism assembly of claim 22, wherein the rake assembly comprises a drive cage disposed about the column and extending from the rotary drive mechanism to rake arms extending substantially radially outwardly therefrom.

24. The lifting mechanism assembly of claim 23, further including a vertical guide member positioned about the column to constrain non-vertical movement of the rake assembly.

25. A method for lifting or lowering a rake assembly within a sedimentation tank, comprising:

supporting a rotary drive mechanism on a stationary support proximate a center of a sedimentation tank, the rotary drive mechanism having secured thereto a rake assembly rotatable about the sedimentation tank center;

rotating the rake assembly using the rotary drive mechanism;

transmitting torque associated with rotation of the rake assembly by the rotary drive mechanism between the rotary drive mechanism and the stationary support through at least one elongate member hinged to rotate about a horizontal axis at ends thereof; and lifting or lowering the rotary drive mechanism with respect to the stationary support while the rake assembly is rotating.

26. The method of claim 25, further comprising transmitting torque through first and second elongate members, each of the first and second elongate members being hinged to rotate at one end thereof about a horizontal axis with respect to a different one of the stationary support and the rotary drive mechanism and hinged to rotate about a horizontal axis at another end thereof with respect to each other.

27. A sedimentation tank system for settling a liquid solid slurry into a clarified liquid effluent phase and a solid underflow phase, the system comprising:

a tank having a floor;

a rake assembly positioned in the tank and rotatable about a vertical center line of the tank;

a stationary support having at least one portion thereof positioned proximate the vertical center line of the tank;

a rotary drive mechanism operably connected to the rake assembly to effect rotation thereof;

an actuation mechanism to vertically lift the rotary drive mechanism with respect to the stationary support; and at least one linkage extending between the stationary support and the rotary drive mechanism, the at least one linkage comprising at least one elongate member pivotally mounted for rotation about a horizontal axis at one end thereof to the at least one portion of the stationary support positioned proximate the vertical center line and pivotally mounted for rotation about a horizontal axis at another end thereof to the rotary drive mechanism, the at least one elongate member of the at least one linkage comprising an upper hinge plate pivotally secured to an upper support surface connected to said rotary drive mechanism and a lower hinge plate pivotally secured to a lower support surface connected to the stationary support, the upper hinge plate and the lower hinge plate being pivotally joined to each other at a horizontally-oriented hinge point.

28. The system of claim 27, further comprising a vertical guide member positioned between at least a portion of the rake assembly and the stationary support to constrain non-vertical movement of the rake assembly relative to the stationary support.

29. The system of claim 27, wherein the at least one elongate member comprises a plurality of elongate members located at spaced intervals around the vertical center line of said tank.

30. The lifting mechanism assembly of claim 27, wherein the stationary support includes a bridge positioned at least in part across a diameter of the tank and wherein the rotary drive mechanism is vertically movable relative to the bridge.

31. The system of claim 30, wherein the actuation mechanism is positioned between the bridge and the rotary drive mechanism.

32. The system of claim 31, wherein the rake assembly includes a drive shaft connected to and carried by the output shaft of the rotary drive mechanism, and rake arms secured thereto and extending substantially radially outwardly therefrom.

33. The system of claim 32, further including a vertical guide member positioned about the drive shaft to constrain non-vertical movement of the drive shaft.

34. The system of claim 27, wherein the stationary support includes a column extending from the floor of the tank along the vertical center line and the rotary drive mechanism is vertically movable relative to the column.

35. The system of claim 34, wherein the actuation mechanism is positioned between the column and the rotary drive mechanism.

36. The system of claim 35, wherein the rake assembly comprises a drive cage disposed about the column and extending from the rotary drive mechanism to rake arms extending substantially radially outwardly therefrom.

37. The system of claim 36, further including a vertical guide member positioned about the column to constrain non-vertical movement of the rake assembly.

* * * * *

UNITED STATES PATENT AND TRADEMARK OFFICE
CERTIFICATE OF CORRECTION

PATENT NO : 5,997,740  
DATED : December 7, 1999  
INVENTOR(S) : Cook et al.

Page 1 of 8

It is certified that error appears in the above-identified patent and that said Letters Patent is hereby corrected as shown below:

| | | |
|---|---|---|
| Title Page, Section [63], line 4, | | change "Jun. 12, 1997" to --Jun. 21, 1997--; |
| Column 1, | line 11, | change "Jun. 12, 1997" to --Jun. 21, 1997--; |
| Column 2, | line 59, | delete "," after "axis"; |
| Column 4, | line 61, | after "fluid" (first occurrence) delete ","; |
| Column 5, | line 46, | after "fluid" delete ","; |
| Column 7, | line 19, | change "tanks," to --tank--; |
| Column 9, | line 51, | after "20" insert --,--; |
| Column 10, | line 6, | after "the" insert --rigid--; |
| Column 10, | line 9, | after "the" insert --rigid--; |
| Column 10, | line 11, | after "34B" delete ","; |
| Column 10, | line 19, | after "other" insert --upper--; |
| Column 10, | line 23, | after "other" insert --lower--; |
| Column 10, | line 27, | delete "Arms" and insert --Upper arms-- therefor; |
| Column 10, | line 29, | after "that" (first occurrence) insert --upper--; |
| Column 10, | line 31, | after "of" (second occurrence) insert --connecting--; |
| Column 10, | line 33, | after "connects" insert --lower--; |
| Column 10, | line 39, | change "a lifting" to --an actuation--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

| | | |
|---|---|---|
| Column 10, | line 44, | after "parallel" insert --upper--; change "arms" to --arm-- (both instances); after "and" insert --lower arm-- (both instances); and after "of" insert --upper--; |
| Column 10, | line 46, | after "by" insert --connecting--; |
| Column 10, | line 47, | change "Pin" --Connecting pin--; |
| Column 10, | line 48, | change "Pin" to --Connecting pin--; |
| Column 10, | line 60, | change "Link" to --Upper link" and after "to" insert --upper--; |
| Column 10, | line 62, | change "Link" to --Lower link--; |
| Column 10, | line 63, | after "to" insert --lower--; |
| Column 11, | line 5, | after "along" insert --upper--; |
| Column 11, | line 7, | after "to" insert --upper--; |
| Column 11, | line 8, | after "along" insert --lower--; |
| Column 11, | line 9, | after "to" insert --lower--; |
| Column 11, | line 11, | change "lifting" to --actuation--; |
| Column 11, | line 14, | change "supports" to --support columns--; |
| Column 11, | line 18, | change "lifting" to --actuation--; |
| Column 11, | line 38, | insert --rake drive-- before "motor 100"; |

UNITED STATES PATENT AND TRADEMARK OFFICE
CERTIFICATE OF CORRECTION

PATENT NO  :   5,997,740
DATED      :   December 7, 1999
INVENTOR(S):   Cook et al.

It is certified that error appears in the above-identified patent and that said Letters Patent is hereby corrected as shown below:

| | | |
|---|---|---|
| Column 11, | line 39, | insert --rake drive-- before "motor 100"; |
| Column 11, | line 40, | after "the" (1st and 2nd occurrences) insert --rake--; |
| Column 11, | line 41, | change "lifting" to --actuation--; |
| Column 11, | line 43, | after "the" (1st and 2nd occurrences) insert --rake drive--; |
| Column 11, | line 44, | insert --rake-- before "drive"; |
| Column 11, | line 46, | after "of" insert --upper--; |
| Column 11, | line 47, | insert --lower arms-- before "34A," and after "the" insert --rake--; |
| Column 11, | line 48, | after "the" insert --rake--; |
| Column 11, | line 49, | after "the" insert --rake--; |
| Column 11, | line 51, | after "the" (1st occurrence) insert --rake--; |
| Column 11, | line 52, | after "about" insert --connecting--; |
| Column 11, | line 53, | after "the" insert --rake--; |
| Column 11, | line 55, | change "lifting" to --actuation--; |
| Column 11, | line 59, | after "the" insert --rake--; |
| Column 11, | line 63, | after "vertical" insert --rake--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

| | | |
|---|---|---|
| Column 12, | line 34, | change "lifting" to --actuation--; |
| Column 12, | line 35, | change "lifting" to --actuation--; |
| Column 12, | line 37, | change "lifting" to --actuation--; |
| Column 12, | line 40, | change "guiding and" to --and guiding--; |
| Column 12, | line 42, | change "lifting" to --actuation--; |
| Column 13, | line 5, | change "link arm 204," to --link arm 204A,--; |
| Column 13, | line 21, | change "arms" to --arm--; |
| Column 13, | line 36, | change "lifting" to --actuation--; |
| Column 13, | line 46, | after "The" insert --central--; |
| Column 13, | line 55, | change "lifting" to --actuation--; |
| Column 13, | line 66, | after "(i.e.," insert --vertical) direction.-- and delete "including the rake d."; |
| Column 13, | line 67, | delete "," after "mechanism"; |
| Column 14, | line 7, | after "guiding" insert --mechanism--; |
| Column 14, | line 8, | change "lifting" to --actuation--; |
| Column 14, | line 18, | change "assembly" to --mechanism--; |
| Column 14, | line 20, | after "the" (first occurrence) insert --rake--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

| | | |
|---|---|---|
| Column 14, | line 21, | change "rotatory" to --rotary--; |
| Column 14, | line 31, | change "lifting" to --actuation--; |
| Column 14, | line 35, | change "structure" to --mechanism--; |
| Column 15, | line 21, | after "mechanism" insert --assembly--; |
| Column 15, | line 35, | change "include" to --includes--; |
| Column 16, | line 47, | after "the" insert --rake--; |
| Column 17, | line 17, | after "A" insert --rake--; |
| Column 17, | line 21, | after "The" (first occurrence) insert --rake--; |
| Column 17, | line 23, | after "the" insert --rake--; |
| Column 17, | line 24, | change "lifting" to --actuation--; |
| Column 17, | line 28, | change "lifting" to --actuation--; |
| Column 17, | line 44, | after "the" insert --rake--; |
| Column 17, | line 46, | after "the" (first occurrence) insert --rake--; |
| Column 17, | line 48, | after "the" insert --rake--; |
| Column 17, | line 51, | after "the" insert --rake--; |
| Column 17, | line 52, | change "lifting" to --actuation--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

| | | |
|---|---|---|
| Column 18, | line 16, | change "lifting" to --actuation--; |
| Column 18, | line 25, | after "such" delete "-"; |
| Column 18, | line 26, | after "may" insert --also--; |
| Column 18, | line 54, | change "lifting" to --actuation--; |
| Column 18, | lines 55-56, | delete "and the column 432"; |
| Column 19, | line 9, | after "the" (both occurrences) insert --rake--; |
| Column 19, | line 10, | change "lifting" to --actuation--; |
| Column 19, | line 14, | after "the" (1st occurrence) insert --rake--; |
| Column 19, | line 15, | after "The" insert --rake--; |
| Column 19, | line 16, | change "lifting" to --actuation--; |
| Column 19, | line 17, | after "the" (2nd occurrence) insert --rake--; |
| Column 19, | line 20, | change "lifting" to --actuation-- and after "the" insert --rake--; |
| Column 19, | line 28, | after "the" insert --rake--; |
| Column 19, | line 32, | delete "," after "adjacency"; |
| Column 19, | line 37, | after "the" insert --rake--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

|  | Column 19, | line 38, | after "the" (1st occurrence) insert --rake--; |
|---|---|---|---|
|  | Column 19, | line 42, | after "and" insert --rake--; |
|  | Column 19, | line 43, | after "the" (1st occurrence) insert --rake--; |
|  | Column 19, | line 47, | after "the" insert --rake--; |
|  | Column 19, | line 48, | after "the" (1st occurrence) insert --rake--; |
|  | Column 19, | line 49, | change "lifting" to --actuation--; |
|  | Column 20, | line 13, | before "therefore," insert --and,--; |
|  | Column 20, | line 16, | change "lifting" to --actuation--; |
|  | Column 20, | line 18, | change "lifting" to --actuation--; |
|  | Column 20, | line 20, | change "lifting" to --actuation--; |
|  | Column 20, | line 46, | change "lifting" to --actuation--; |
| Claim 1, | Column 21, | line 48, | after "thereof;" insert --and--; |
| Claim 1, | Column 21, | line 58, | after "line" insert --of the tank--; |
| Claim 7, | Column 22, | line 18, | delete "the" and insert --an-- therefor; |
| Claim 12, | Column 22, | line 37, | after "column" insert --to--; |

UNITED STATES PATENT AND TRADEMARK OFFICE
CERTIFICATE OF CORRECTION

PATENT NO : 5,997,740
DATED : December 7, 1999
INVENTOR(S) : Cook et al.

It is certified that error appears in the above-identified patent and that said Letters Patent is hereby corrected as shown below:

| | | | |
|---|---|---|---|
| Claim 13, | Column 22, | line 39, | delete "the" and insert --a-- therefor; |
| Claim 19, | Column 23, | line 14, | delete "the" (first occurrence) and insert --an-- therefor; |
| Claim 21, | Column 23, | line 22, | after "line" insert --of the tank--; |
| Claim 27, | Column 24, | line 14, | after "line" insert --of the tank--; |
| Claim 30, | Column 24, | line 33, | delete "lifting mechanism assembly" and insert --system-- therefor; and |
| Claim 32, | Column 24, | line 41, | delete "the" and insert --an-- therefor. |

Signed and Sealed this

Thirteenth Day of March, 2001

*Attest:*

NICHOLAS P. GODICI

*Attesting Officer*     *Acting Director of the United States Patent and Trademark Office*